United States Patent
Griot et al.

(10) Patent No.: US 9,942,762 B2
(45) Date of Patent: Apr. 10, 2018

(54) PROVISIONING CREDENTIALS IN WIRELESS COMMUNICATIONS

(71) Applicant: QUALCOMM Incorporated, San Diego, CA (US)

(72) Inventors: Miguel Griot, La Jolla, CA (US); Gavin Bernard Horn, La Jolla, CA (US); Stefano Faccin, Hayward, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 14/669,296

(22) Filed: Mar. 26, 2015

(65) Prior Publication Data
US 2015/0281966 A1    Oct. 1, 2015

Related U.S. Application Data

(60) Provisional application No. 61/972,034, filed on Mar. 28, 2014.

(51) Int. Cl.
| | |
|---|---|
| *H04W 12/08* | (2009.01) |
| *G06F 21/44* | (2013.01) |
| *H04L 29/06* | (2006.01) |
| *H04W 4/00* | (2018.01) |
| *H04W 12/06* | (2009.01) |
| *H04W 12/04* | (2009.01) |

(52) U.S. Cl.
CPC ............ *H04W 12/08* (2013.01); *G06F 21/44* (2013.01); *H04L 63/0892* (2013.01); *H04W 4/001* (2013.01); *H04W 12/04* (2013.01); *H04W 12/06* (2013.01)

(58) Field of Classification Search
CPC ..... H04W 12/06; H04W 12/08; H04W 4/001; H04L 63/04; H04L 63/06; H04L 63/08–63/0846; H04L 63/0892; H04L 63/10–63/102; H04L 9/32; H04L 9/321; H04L 9/3213; H04L 9/3263; H04L 9/3268; H04L 29/06755–29/06782; H04L 29/06823–29/06836
See application file for complete search history.

(56) References Cited

U.S. PATENT DOCUMENTS

| | | | |
|---|---|---|---|
| 9,220,118 B1 * | 12/2015 | Ramamurthy | ........ H04W 76/02 |
| 9,277,387 B2 * | 3/2016 | Suh | .......... H04W 4/22 |
| 9,363,708 B2 * | 6/2016 | Anwar | ................. H04W 28/08 |

(Continued)

OTHER PUBLICATIONS

"Verizon iPhone APN Settings—Step by Step Configuration" [Online] Jul. 9, 2013 [Retrieved on: Dec. 3, 2016], www.apn-settings.com, Retrieved from: <http://apn-settings.com/verizon-iphone-apn-settings/>.*

(Continued)

*Primary Examiner* — Eric W Shepperd
(74) *Attorney, Agent, or Firm* — Arent Fox, LLP

(57) ABSTRACT

Aspects described herein relate to obtaining provisioned credentials for wireless network services. It can be determined that credentials have not been configured for accessing a network. In this case, a provisioning server supported by the network for obtaining credentials is selected, and a request to establish a connection with the network is transmitted. The transmitted request can indicate the provisioning server.

44 Claims, 19 Drawing Sheets

(56) References Cited

U.S. PATENT DOCUMENTS

| | | | |
|---|---|---|---|
| 2005/0091357 A1* | 4/2005 | Krantz | H04L 12/5692 709/223 |
| 2009/0193130 A1* | 7/2009 | Fiatal | H04L 51/24 709/229 |
| 2012/0039213 A1* | 2/2012 | Cheng | H04W 76/022 370/254 |
| 2012/0054486 A1* | 3/2012 | Lakkavalli | G06F 21/57 713/156 |
| 2012/0140731 A1* | 6/2012 | Drapkin | H04W 12/04 370/331 |
| 2012/0302196 A1* | 11/2012 | Chin | H04W 76/045 455/404.1 |
| 2013/0077482 A1* | 3/2013 | Krishna | H04W 36/22 370/230 |
| 2013/0157673 A1* | 6/2013 | Brusilovsky | H04W 8/205 455/450 |
| 2013/0182644 A1* | 7/2013 | Kim | H04W 76/025 370/328 |
| 2013/0205134 A1 | 8/2013 | Holtmanns et al. | |
| 2013/0305330 A1* | 11/2013 | Palanigounder | H04L 63/062 726/6 |
| 2014/0086144 A1* | 3/2014 | Foti | H04L 61/106 370/328 |
| 2015/0264051 A1* | 9/2015 | Hoggan | H04L 63/0892 726/1 |
| 2016/0205593 A1* | 7/2016 | Kauppinen | H04W 24/02 370/235 |
| 2016/0219038 A1* | 7/2016 | Stephenson | H04L 63/0823 |
| 2017/0366681 A1* | 12/2017 | Seuken | H04W 16/00 |

OTHER PUBLICATIONS

International Search Report and Written Opinion—PCT/US2015/023057—ISA/EPO—dated Jul. 6, 2015. (12 total pages).

* cited by examiner

PROVISIONING CREDENTIALS IN WIRELESS COMMUNICATIONS

CLAIM OF PRIORITY UNDER 35 U.S.C. § 119

The present application for Patent claims priority to Provisional Application No. 61/972,034 entitled "APPARATUS AND METHOD FOR PROVISIONING CREDENTIALS IN WIRELESS COMMUNICATIONS" filed Mar. 28, 2014, which is assigned to the assignee hereof and hereby expressly incorporated by reference herein.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

Network deployment for these systems is typically fixed, and thus the eNBs communicate with a home network related to a UE to obtain and/or verify subscription information for the UE on a given network. Wireless networks typically employ a home subscriber server (HSS) for managing information relating to UEs subscriber to the wireless network, which may be based on identifying the UE using its international mobile subscriber identifier (IMSI) and/or other identification. In this regard, eNBs providing wireless network access to a UE can communicate with the UE's HSS (e.g., by traversing one or more network nodes) to verify the UE's subscription. In many examples, the eNB can be on a visiting network and can access the HSS on the UE's home network to verify the subscription.

There is a desire, however, to allow UEs to communicate using one or more wireless network technologies in other contexts over third-party networks where authentication is managed by an owner of the third-party network and/or where frequency bands in unlicensed spectrums are used for communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for obtaining provisioned credentials for wireless network services is provided. The method includes determining that credentials have not been configured for accessing a network, selecting a provisioning server supported by the network for obtaining credentials, and transmitting a request to establish a connection with the network, wherein the request indicates the provisioning server.

In another example, an apparatus for obtaining provisioned credentials for wireless network services is provided. The apparatus includes a service querying component configured to determine that credentials have not been configured for accessing a network, a credential requesting component configured to select a provisioning server supported by the network for obtaining credentials, and a connection establishing component configured to transmit a request to establish a connection with the network, wherein the request indicates the provisioning server.

In yet another example, an apparatus for obtaining provisioned credentials for wireless network services is provided. The apparatus includes means for determining that credentials have not been configured for accessing a network, means for selecting a provisioning server supported by the network for obtaining credentials, and means for transmitting a request to establish a connection with the network, wherein the request indicates the provisioning server.

In another example, a computer-readable medium for obtaining provisioned credentials for wireless network services is provided. The computer-readable medium includes code for determining that credentials have not been configured for accessing a network, code for selecting a provisioning server supported by the network for obtaining credentials, and code for transmitting a request to establish a connection with the network, wherein the request indicates the provisioning server.

According to an example, a method for obtaining provisioned credentials for wireless network services is provided. The method includes receiving a request to establish a connection from a user equipment (UE), the request indicating a provisioning server, selecting a gateway for establishing a packet data context for the UE based at least in part on the request, and sending a session request message to the gateway to establish the packet data context for the UE.

In another example, an apparatus for obtaining provisioned credentials for wireless network services is provided. The apparatus includes a connection establishing component configured to receive a request to establish a connection from a UE, the request indicating a provisioning server, and a gateway communicating component configured to select a gateway for establishing a packet data context for the UE based at least in part on the request and send a session request message to the gateway to establish the packet data context for the UE.

In yet another example, an apparatus for obtaining provisioned credentials for wireless network services is provided. The apparatus includes means for receiving a request to establish a connection from a UE, the request indicating a provisioning server, and means for selecting a gateway for establishing a packet data context for the UE based at least in part on the request and sending a session request message to the gateway to establish the packet data context for the UE.

In another example, a computer-readable medium for obtaining provisioned credentials for wireless network services is provided. The computer-readable medium includes code for receiving a request to establish a connection from a UE, the request indicating a provisioning server, code for selecting a gateway for establishing a packet data context for the UE based at least in part on the request, and code for sending a session request message to the gateway to establish the packet data context for the UE.

According to an example, a method for obtaining provisioned credentials for wireless network services is provided. The method includes establishing a session for a UE for provisioning credentials to access a network, determining specific information regarding a provisioning server based at least in part on the request, and limiting external access for the UE to the provisioning server.

In another example, an apparatus for obtaining provisioned credentials for wireless network services is provided. The apparatus includes a network communicating component configured to establish a session for a UE for provisioning credentials to access a network, and a communication managing component configured to determine specific information regarding a provisioning server based at least in part on the request and limit external access for the UE to the provisioning server.

In yet another example, an apparatus for obtaining provisioned credentials for wireless network services is provided. The apparatus includes means for establishing a session for a UE for provisioning credentials to access a network, and means for determining specific information regarding a provisioning server based at least in part on the request and limiting external access for the UE to the provisioning server.

In another example, a computer-readable medium for obtaining provisioned credentials for wireless network services is provided. The computer-readable medium includes code for establishing a session for a UE for provisioning credentials to access a network, code for determining specific information regarding a provisioning server based at least in part on the request, and code for limiting external access for the UE to the provisioning server.

In another example, a computer-readable medium for advertising wireless network services is provided including code for causing at least one computer to broadcast a message including a network identifier, wherein the network identifier indicates a type of network, code for causing the at least one computer to establish a connection with one or more user equipments (UEs), and code for causing the at least one computer to provide service information to the one or more UEs based at least in part on a service query.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
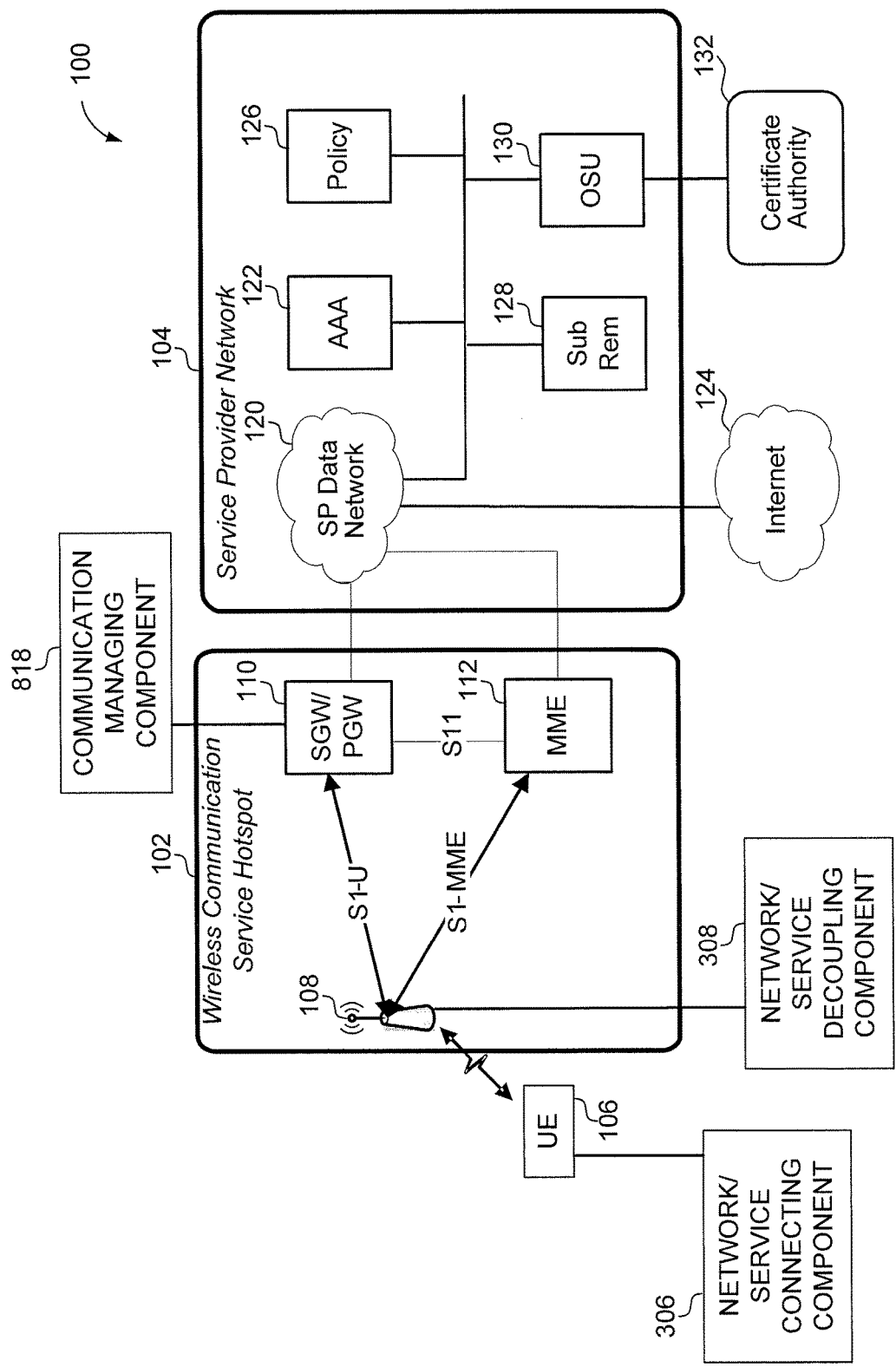
FIG. 1 illustrates an example system for advertising network services in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to decoupling service identification information and network identification information for network and subscription selection in wireless communications, which allows one network provider to provide network devices with network access to a network service of a different network provider. The service identification information can include one or more identifiers relating to a network service offered by a network node, one or more identifiers of a subscription provider related to the network service, etc., such that a user equipment (UE) can determine whether and/or how to access the network service (e.g., based on credentials corresponding to the subscription provider, etc.). The network identification information can include one or more identifiers of a network provider related to a network node that can offer various network services, as described herein.

In particular, in an example, a network can allow for access using a wireless communication service and providing subscription management without requiring a home subscriber server (HSS) or other components typically associated with the wireless communication service. In this regard, for example, a user equipment (UE) can discover services and service providers based at least in part on messages broadcast by eNodeBs (eNB) offering the services, and can perform network selection to communicate with the eNBs to receive the service, though the service may not be provided by a typical mobile network operator (MNO) associated with the eNBs. For example, an eNB may advertise LTE hotspot services provided by an owner of a related network (e.g., as opposed to an MNO), as described further herein. Credentialing for the UE can be managed by an authentication, authorization, and accounting (AAA) server present in the wireless network.

In addition, a UE can determine whether and/or which credentials are needed to communicate with the eNB to receive the service, and can provide the appropriate credentials based on performing the network selection. For example, credentials can relate parameters managed by a network to control access to the network for one or more UEs. For example, the credentials can be assigned to or specified by the UE. In one example, credentials can include an identifier of the UE (e.g., international mobile subscriber identity (IMSI), security root key (Ki) or other USIM credentials), username/password pairs, and/or similar credentials that present a UE with a challenge to access the network. Credentials can also be referred to herein as a set of credentials. Moreover, for example, credentials for the service can be provisioned to the UE by the eNB or other network component in certain cases to allow the UE to use the service (e.g., after paying for the service, fulfilling some other requirement to use the service, etc.). Thus, the UE can provide received or otherwise specified credentials to the AAA server via the eNB to receive the related services. This can be useful to provide a hotspot for long term evolution (LTE) or other wireless communication service to allow UEs to utilize LTE in communicating over a network providing the hotspot by accessing the network based on the credentials controlled by the network rather than MNO authentication. In another example, this can be useful to provide wireless communication service offload such that the network provides LTE access to subscribers of a particular mobile network operator (MNO) to extend the service area of the MNO in a different frequency spectrum such that the LTE access can be managed by a third party. These examples may utilize an unlicensed frequency spectrum to communicate with the UEs. In this regard, LTE access service can be provided to UEs by networks that may be managed by entities that may not include MNOs related to a home network of the UEs by allowing the service identification information (e.g., a service identifier of LTE) to be decoupled from the network identification information.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, a wireless communication system 100 is illustrated that facilitates providing wireless access to network services. System 100 includes a wireless communication service hotspot 102, which can provide a cell to receive wireless communications from one or more UEs to provide access to a backend service provider network 104 (e.g., via one or more other co-located or remotely located network nodes). In this example, the components shown in the wireless communication service hotspot 102 typically may communicate to provide access to a specific mobile network operator using the wireless communication service, such as LTE, GSM, etc. In this example, a UE 106 communicates with an eNB 108 portion of the wireless communication service hotspot 102 that provides the cell, such to access a serving gateway (SGW)/packet data network (PDN) gateway (PGW) 110 and/or a mobility management entity 112, which may also be included in the hotspot 102. In one example, where the eNB 108 communicates using an LTE radio access technology, the wireless communication service hotspot 102 may be referred to as an LTE hotspot. This configuration can also be referred to as LTE unlicensed for WLAN (LTE-U-W) deployment.

The wireless communication service hotspot 102 may be operated by various operators (e.g., a residential network operator, an enterprise network operator, a cable network operator, etc.) to provide LTE radio network access to the service provider network 104. In this regard, the wireless communication service hotspot 102 may not be associated with a MNO and thus may not be identifiable by a PLMN ID (e.g., where the network operator does not have an associated mobile network code (MNC) that forms part of the PLMN ID). Accordingly, as described further herein, network identification information and service identification information can be decoupled at the wireless communication service hotspot 102 such to allow the UE 106 to separately identify the network operator and/or service information of the wireless communication service hotspot 102. Accordingly, for example, the UE 106 may include a network/service connecting component 306, as described further herein, to request information regarding network services, supported subscription providers, credentials, etc. In addition, for example, eNB 108 may include a network/service decoupling component 308, as described further herein, to provide network identification information and service identification information to one or more UEs. As described, for example, the network identification information may include one or more identifiers of a network providing the services, and the service identification information may include supported subscription providers, information for obtaining credentials, etc. Moreover, for example, SGW/PGW 110 may include a communication managing component 818 that may limit external communications to one or more components of the service provider network 104 while obtaining credentials for the UE 106.

UE 106 can include any type of mobile device, such as, but not limited to, a smartphone, cellular telephone, mobile phone, laptop computer, tablet computer, or other portable networked device that can be a standalone device, tethered to another device (e.g., a modem connected to a computer), and/or the like. In addition, UE 106 may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 106 may be small and light enough to be considered portable and may be configured to communicate wirelessly via an over-the-air communication link using one or more OTA communication protocols described herein. Additionally, in some examples, UE 106 may be configured to facilitate communication on multiple separate networks via multiple separate subscriptions, multiple radio links, and/or the like.

eNB 108 may include an access point, such as a macro cell access point, a small cell access point, and/or the like. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell.

In typical LTE deployments, for example, the MME 112 provides the UE 106 with bearer setup procedures, access to SGW/PGW 110 and other core MNO network components (e.g., an HSS), etc., and SGW/PGW 110 provides the UE 106 with access to an Internet connection and/or other external nodes. In the depicted example, however, SGW/PGW 110 and MME 112 provide the UE 106 with access to service provider (SP) data network 120. It is to be appreciated, in this regard, that the MME 112 can setup a bearer for UE 106 to communicate via eNB 108 to access components of the service provider network 104 via SP data network 120. This can include setting up a radio bearer between UE 106 and eNB 108 as well as a data bearer between eNB 108 and SGW/PGW 110 and/or additional components of network 104. In addition, the user and control plane communications may be collapsed for communicating with certain elements in the network 104. Moreover, for example, security can be modified such to use extensible authentication protocol (EAP) or similar security mechanisms over the non-access stratum (NAS) layer between UE 106 and mobility management entity (MME) 112, as described further herein.

Network 104 further includes an AAA server 122 for establishing and verifying credentials of UE 106 for accessing the network 104. SP data network 120 can also provide access to Internet 124. Additional servers may optionally be included in the network 104 as well, such as a policy server 126 that can define one or more access policies for a set of credentials, a subscription remediation server 128 that can resolve subscription errors and/or timeouts, and/or an online sign-up (OSU) server 130 for managing subscription credentials for accessing network 104. OSU server 130 can communicate with certificate authority 132 to obtain one or more certificates for managing subscription-based access to network 104. In an example, network 104 can also include a router (not shown) to facilitate WiFi or other wireless access thereto.

In an example, eNB 108 can advertise network services that are discoverable by UE 106 by broadcasting one or more messages indicating available services. The UE 106 can detect the broadcast message from the eNB 108, can establish a connection with the eNB 108 (e.g., based on information in the broadcast message), and can query the eNB 108 for services available and/or related information, such as subscription provider information, credential information or other information to facilitate establishing one or more of the services with the eNB 108. eNB 108 can return the queried information, and UE 106 can establish a service with the eNB 108 based at least in part on the service available, related information, etc. For example, the service may relate to one or more services including accessing network resources via service provider network 104.

Accordingly, for example, eNB 108 may indicate subscription provider information for accessing service provider network 104, and UE 106 can provide the appropriate credentials to the eNB 108 for one or more indicated subscription providers. For example, eNB 108 may request a username/password, personal identification number (PIN), etc. from the UE 106, and the UE 106 can provide the appropriate username/password, PIN, etc. for the service (e.g., based on credentials input via an interface of the UE 106, based on credentials stored at the UE 106 for a given subscription provider or otherwise indicated to the UE 106 by the eNB 108, etc.). In another example (e.g., where the UE 106 does not have credentials for the indicated subscription provider), the eNB 108 can provide a sign-up page requesting registration information for registration of a username/password, requesting payment or acceptance of terms, requesting a certificate, etc. by the UE 106. In this example, when registration information is provided, the eNB 108 can communicate the registration information to the OSU server 130, which can approve the registration information and obtain credentials and/or a certificate, from certificate authority 132, for the UE 106. OSU server 130 can update the AAA server 122 with the credentials for subsequent authentication of the UE 106.

In this regard, UE 106 can request attachment from MME 112 (e.g., using EAP), via eNB 108, by specifying the credentials received from the service provider network 104. In one example, UE 106 can indicate an authentication type as well. MME 112 can provide the credentials (and/or requested authentication type) to AAA server 122. The AAA server 122 can authenticate the UE 106 to access one or more services on service provider network 104. It is to be appreciated that verifying credentials by the AAA server 122 can additionally include verifying the credentials for a particular usage or service indicated by eNB 108 for UE 106 based on one or more policies for the UE 106 in policy server 126. In any case, once the UE 106 is authenticated, MME 112 can trigger a PDN establishment procedure to the service provider network 104 via SGW/PGW 110 to facilitate providing the requested service to UE 106 over an authenticated connection. For example, this can include MME 112 setting up one or more bearers between the eNB 108 and SGW/PGW 110 for accessing the network 104, and/or an associated radio bearer between UE 106 and eNB 108.

Moreover, though shown as separate devices, it is to be appreciated that the different devices may be collapsed into a single actual device that performs the specific functions in some deployments. For example, in an enterprise network, the MME 112 and AAA server 122 functions can be provided in a single entity. In another example, in a residential network for instance, eNB 108, SGW/PGW, MME 112, and AAA server 122 (and/or OSU server 130) can be combined in a single device that can be connected to a home network such that the SGW/PGW functionality provides UE 106 with access to Internet 124 via the home network. In other deployments, it is to be appreciated that some of the components shown in the hotspot 102 can be included in the network 104 along with a gateway function. For instance, in an example deployment, SGW/PGW 110 and MME 112 can be provided in the network 104, along with an HNB gateway that communicates with various eNBs 108 in various hotspot deployments 102 to provide access to SGW/PGW 110 and/or MME 112.

Figure 2:
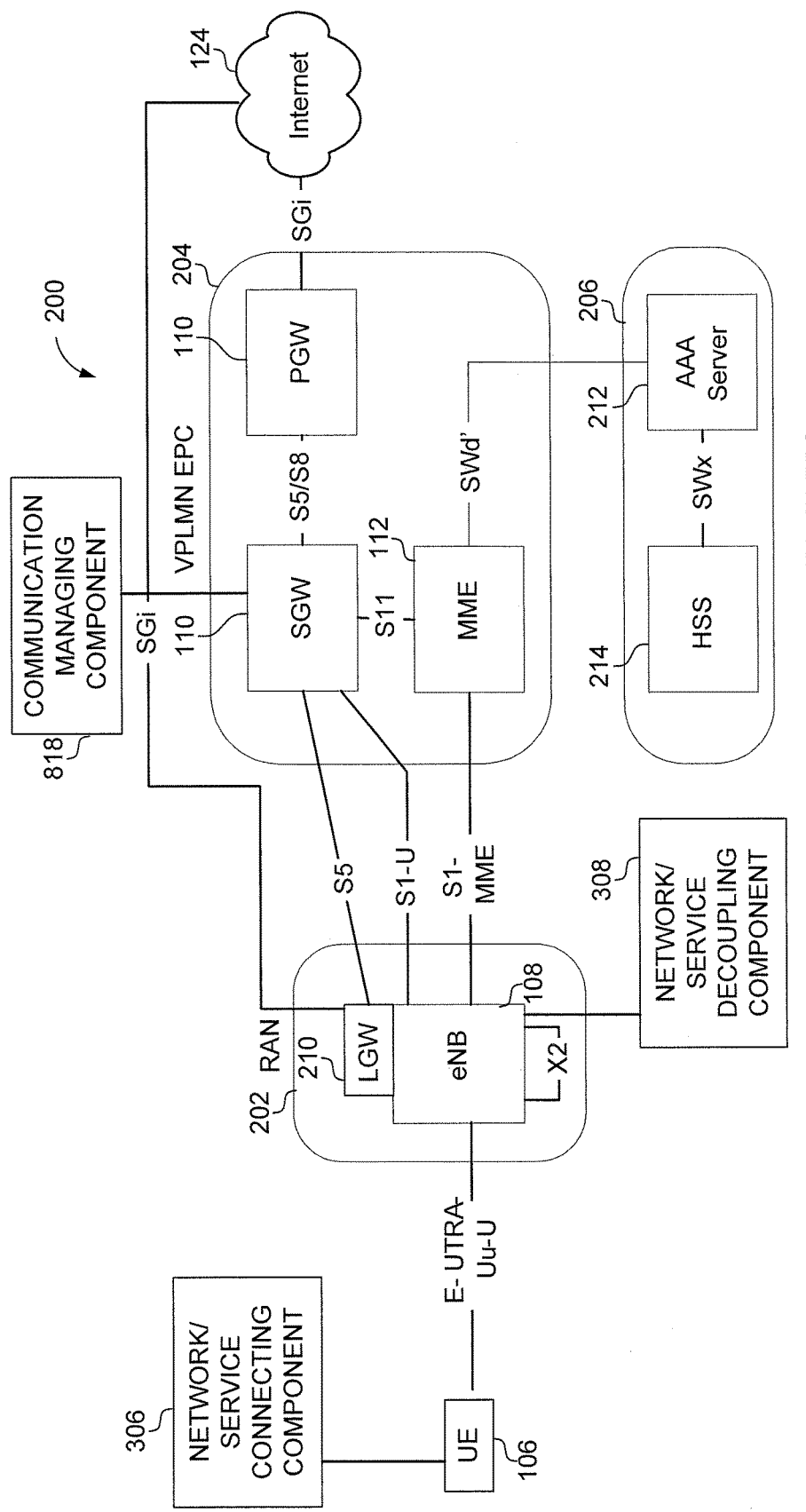
FIG. 2 illustrates an example system for offloading wireless communication services in accordance with aspects described herein.

Referring to FIG. 2, a wireless communication system 200 is illustrated that facilitates providing wireless access to network services. System 200 includes a radio access network (RAN) 202 that provides LTE offload, or offload for other wireless communication services (e.g., UMTS), where the RAN 202 communicates with a visiting public land mobile network (PLMN) evolved packet core (EPC) to allow access to Internet 124. System 200 also depicts a home PLMN (HPLMN) EPC 206 that manages credentials for certain UEs. RAN 202 comprises an eNB 108 and a local gateway (LGW) 210 that facilitate communicating with components of the visiting PLMN (VPLMN) EPC 204 and/or Internet 124. VPLMN EPC 204 is referred to as the visiting PLMN because it is not the HPLMN for UE 106, in this example. VPLMN EPC 204 comprises a SGW/PGW 110 (depicted as separate devices) and an MME 112. HPLMN EPC 206 includes an AAA server 212, which may be different than AAA server 122 of network 104 (FIG. 1) as this AAA server 212 manages AAA functions of the HPLMN EPC, and an HSS 214 for storing subscription information of certain UEs, such as UE 106. Service identification information can be decoupled from network identification information at the RAN 202 such to allow the UE 106 to separately identify the network operator of (corresponding to the network identification information) and/or service (corresponding to the service identification information) provided by the RAN 202. Accordingly, for example, the UE 106 may include a network/service connecting component 306, as described further herein, to request information regarding network services, supported subscription providers, credentials, etc. In addition, for example, eNB 108 may include a network/service decoupling component 308, as described further herein, to provide network identification and service identification information to one or more UEs, where the service identification information may include supported subscription providers, information for obtaining credentials, etc. Moreover, for example, SGW 110

(and/or PGW 110) may include a communication managing component 818 that may limit external communications to one or more components of the service provider network 104 while obtaining credentials for the UE 106.

In this example, the VPLMN EPC 204 and HPLMN EPC 206 can function as a typical mobile network to provide UEs related to the HSS 214 of the HPLMN EPC 206 with access to Internet 124 or other network resources based on the VPLMN EPC 204 verifying subscription information of the UE 106 with HPLMN EPC 206. The RAN 202 can be deployed at a third party that connects to the VPLMN EPC 204 via Internet 124 (e.g., using LGW 210). In this example, eNB 108 operates in an unlicensed frequency spectrum to communicate with UE 106, and provides UE 106 with access to Internet 124 by traversing the VPLMN EPC 204 to which RAN 202 connects, and HPLMN EPC 206 related to the UE 106. Thus, for example, UE 106 can use universal subscriber identity module (USIM) credentials to access RAN 202, where RAN 202 verifies the credentials by accessing HPLMN EPC 204. For example, UE 106 can determine to use the USIM credentials based at least in part on identifying a subscription provider corresponding to the USIM credentials in one or more supported subscription providers indicated by the eNB 108, as described further herein. In this regard, the UE 106 can utilize Internet 124 by offloading to RAN 202 where RAN 202 is able to authenticate the UE 106 via HPLMN EPC 206.

Figure 3:
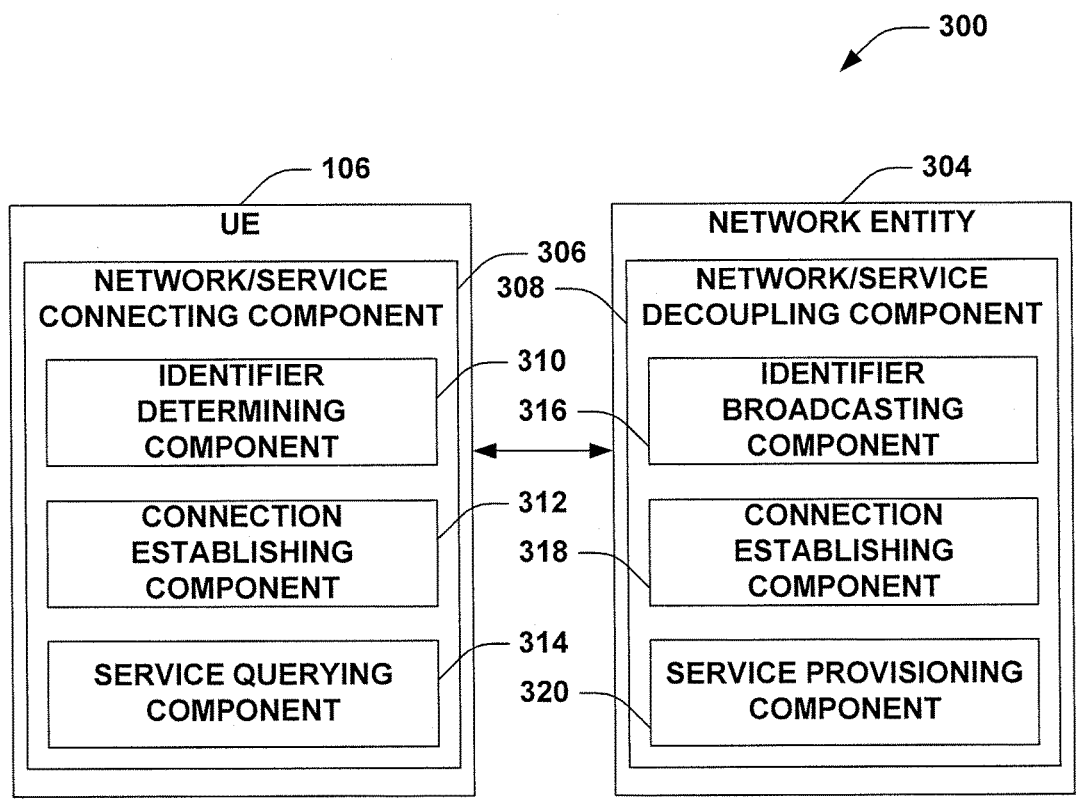
FIG. 3 illustrates an example system for determining available wireless network services in accordance with aspects described herein.
Figure 4:
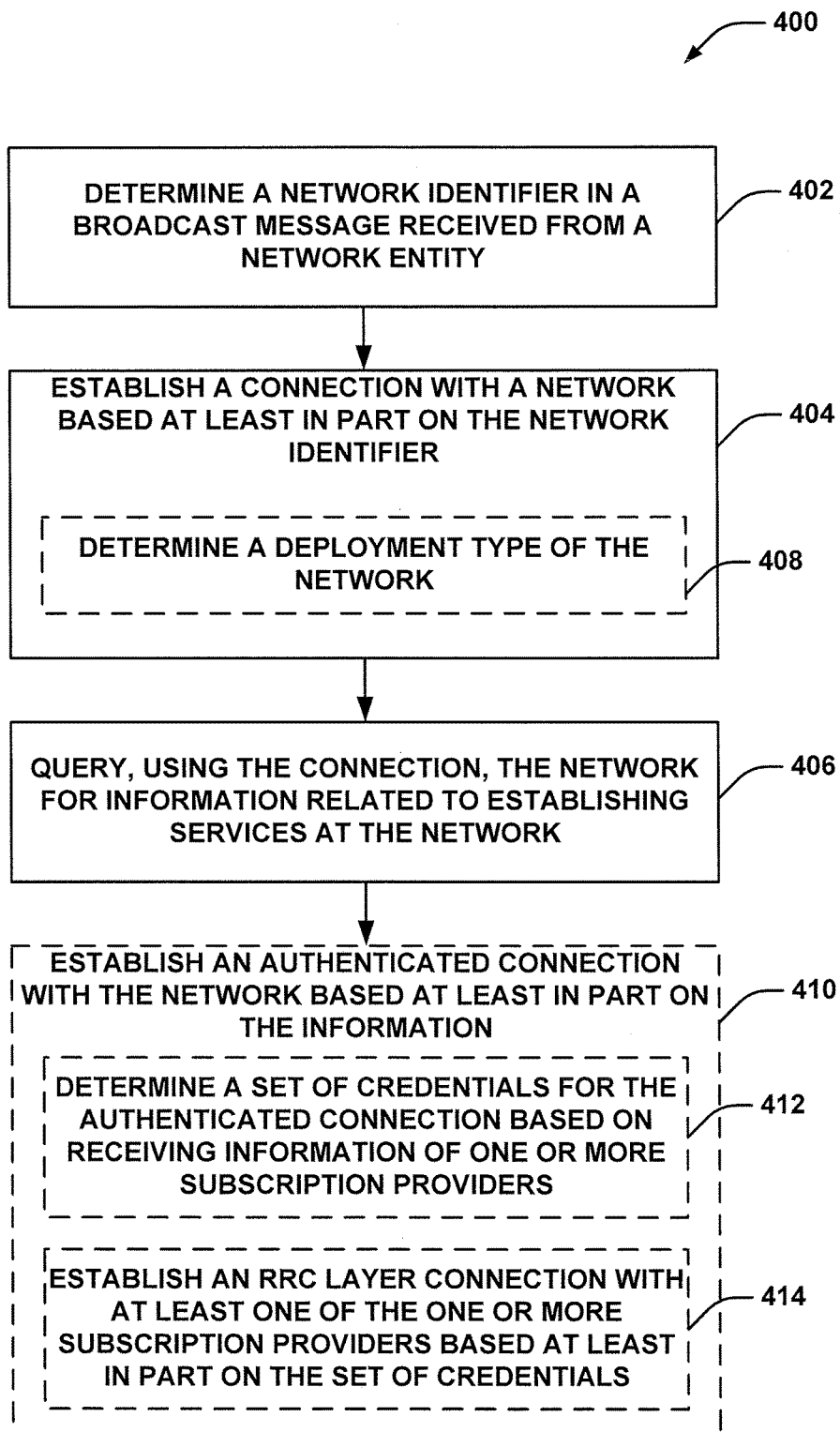
FIG. 4 illustrates an example method for determining available wireless network services in accordance with aspects described herein.
Figure 5:
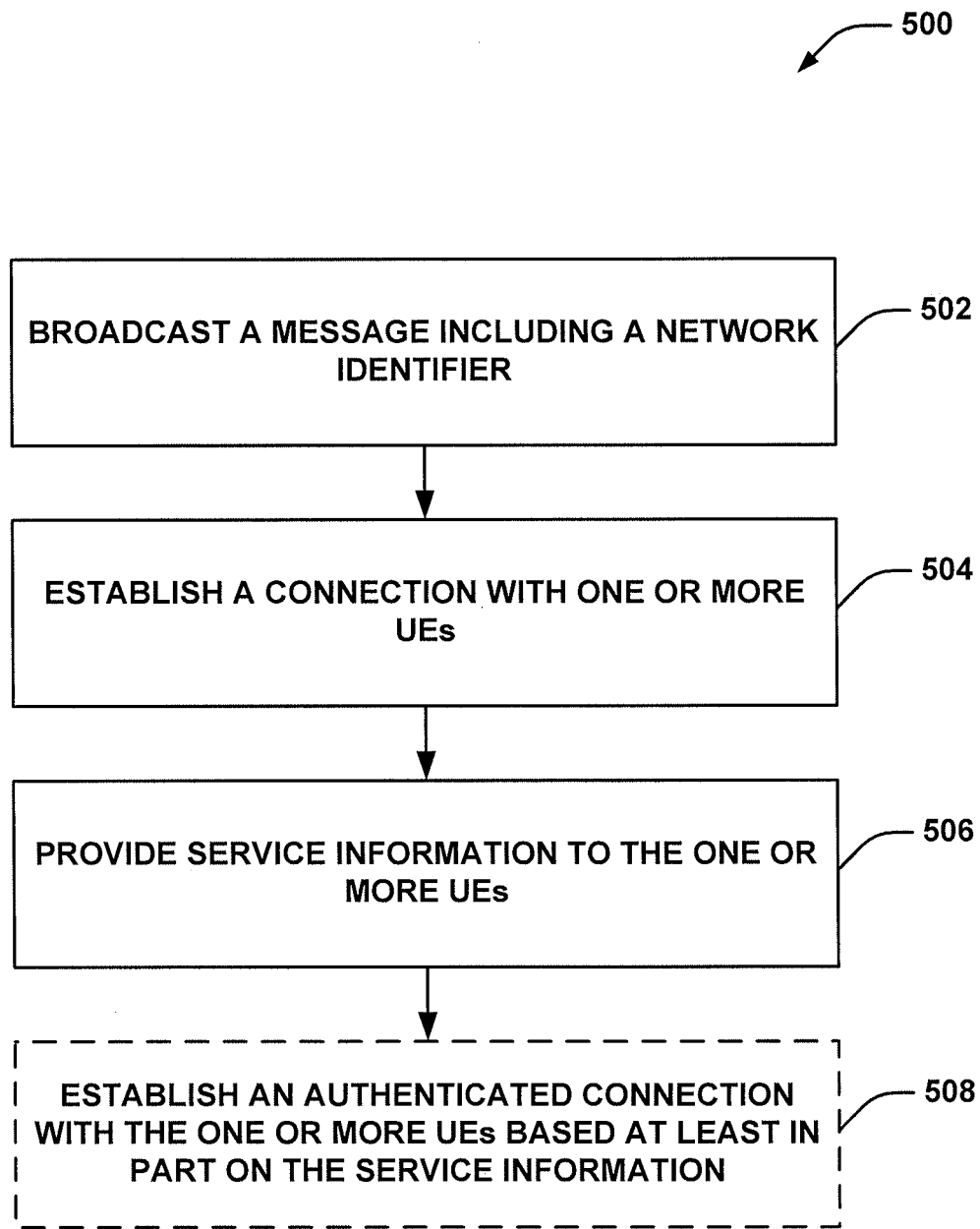
FIG. 5 illustrates an example method for advertising available wireless network services in accordance with aspects described herein.
Figure 6:
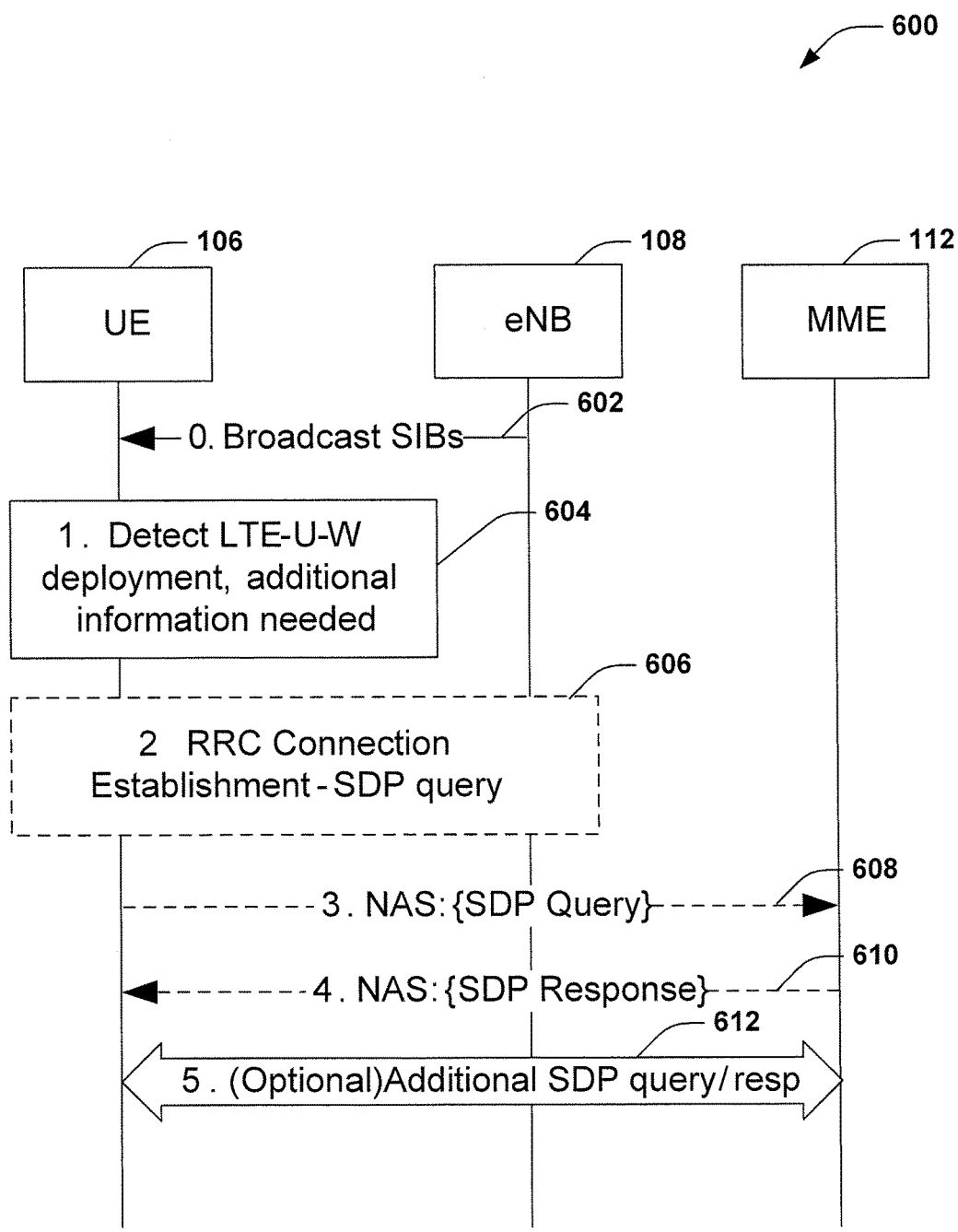
FIG. 6 illustrates an example system for communicating in a wireless network to determine available services in accordance with aspects described herein.
Figure 7:
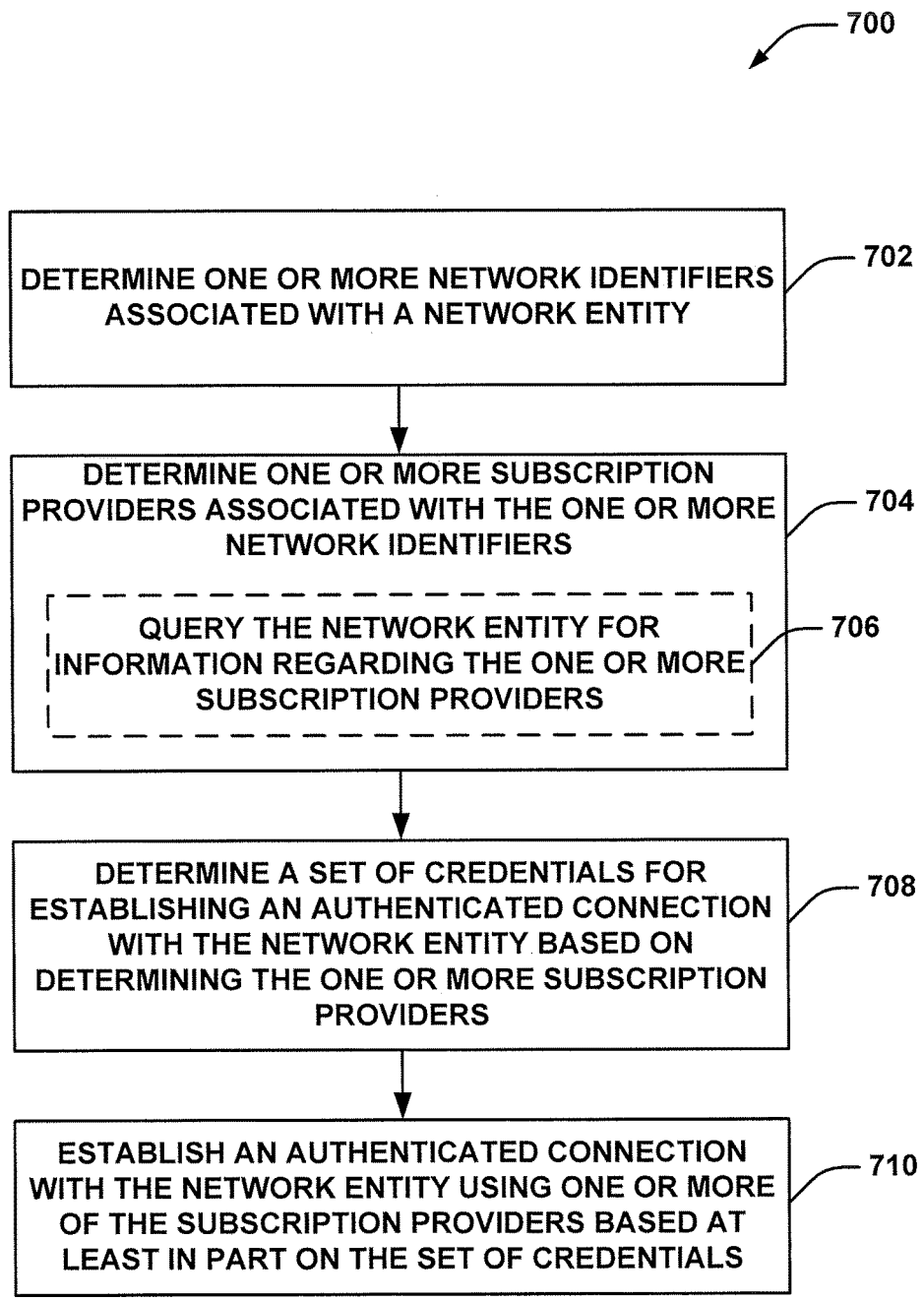
FIG. 7 illustrates an example method for establishing a connection with a network entity in accordance with aspects described herein.

Turning now to FIGS. 3-7, aspects of the present apparatus and method are depicted with reference to one or more components and one or more methods that may perform the actions or functions described herein. Although the operations described below in FIGS. 4, 5, and 7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 3 depicts a system 300 for determining information for performing network selection in a wireless network. System 300 includes a UE 106 that communicates with a network entity 304 to inquire about network services and/or to utilize one or more network services, as described herein. Network entity 304, for example, may include an eNB, such as eNB 108, an MME, such as MME 112, and/or substantially any network component that can communicate information to UE 106.

UE 106 may include a network/service connecting component 306 for determining network identification information and/or service identification information related to network entity 304. For example, network/service connecting component 306 may include an identifier determining component 310 for determining network identification information associated with a network entity, a connection establishing component 312 for establishing a connection with the network entity based at least in part on the network identification information, and a service querying component 314 for querying the network entity for a serving provider related thereto, as described herein.

Network entity 304 may include a network/service decoupling component 308 for separately indicating network identification information and/or related service identification information. Network/service decoupling component 308 may include an identifier broadcasting component 316 for broadcasting network identification information, a connection establishing component 318 for facilitating connection establishment with one or more UEs, and a service provisioning component 320 for provisioning service information (e.g., an indication of a service provider) to the one or more UEs.

FIG. 4 depicts an example method 400 for querying an eNB for service information. FIG. 5 illustrates an example method 500 for providing service information to a UE. Method 400 of FIG. 4 includes, at Block 402, determining a network identifier in a broadcast message received from a network entity. Identifier determining component 310 can determine the network identifier (or other network identification information) in the broadcast message received from the network entity (e.g., network entity 304, which may include an eNB, MME, etc.). Method 500 of FIG. 5 includes, at Block 502, broadcasting a message including a network identifier. Identifier broadcasting component 316 can broadcast message including the network identifier. For example, identifier broadcasting component 316 can broadcast the message over the air such that the message can be received by the UE 106 when within a range of network entity 304. Moreover, for example, the message can be a broadcast message such that the UE 106 need not connect to the network entity 304 to establish dedicated resources before receiving the message. The network identifier, for example, can indicate an owner of the service provider network (e.g., network 104 in FIG. 1) to which the network entity 304 relates. In an example, the broadcast message from the network entity 304 can also relate to a message from an MME transmitted via an eNB.

In an example, the network identifier can indicate a deployment model of the service provider network. For example, the network identifier can include a PLMN identifier (ID), which can indicate an LTE network type or an LTE offload network type that may be associated with a MNO (e.g., as shown in FIG. 2). In another example, the network identifier can include an access network (AN) ID that indicates a network that may not be associated with a PLMN ID (e.g., a non-traditional MNO network such as an LTE hotspot as shown in FIG. 1). For example, the AN ID can be an identifier encoded into system information (e.g., SIB1, or as a new identifier in a new information element (IE), or a reused existing IE, such as PLMN ID using a defined value), etc., as described further herein. In yet another example, the network identifier can include a closed subscriber group (CSG) identifier that can be used along with another private network ID, a public network ID (e.g., a PLMN ID), AN ID, etc., to indicate a private network accessible by UEs in the CSG, where the eNB 108 can support private and/or public networks. In this regard, identifier determining component 310 obtains the network identifier from the broadcast message from the network entity 304, from which a type of network deployment may be determined. It is to be appreciated that a type of the network deployment (e.g., LTE, LTE offload, LTE hotspot, etc.) can be additionally broadcast in other information from network entity 304 (e.g., system information block (SIB) or other broadcast message).

In addition, it is to be appreciated that network entity 304 can broadcast a text based representation of the network identifier, which the identifier determining component 310 can receive for displaying on an interface (not shown) of the UE 106. For example, the text based representation can include a HNB name or other property of the network entity 304 for identification thereof, and may be broadcasted in addition to a CSG identifier for advertising a CSG network. An example of network identifiers that the identifier broadcasting component 316 can broadcast in the message for different types of deployments and networks can be as follows:

| Deployment type | Network (public) | Network (private) |
| --- | --- | --- |
| Operator or offload operator | PLMN | CSG (optional) |
| Combined LTE offload operator and LTE HotSpot operator | PLMN + AN | CSG |
| LTE Hotspot operator only, e.g., residential, enterprise, stadium, cable | AN (optional) | CSG |

Moreover, for example, identifier broadcasting component 316 can broadcast multiple identifiers for a given network entity 304 to indicate multiple deployment types. In an example, identifier broadcasting component 316 may broadcast one identifier for an LTE or LTE offload network (e.g., a PLMN ID) and another identifier for a LTE hotspot network (e.g., an AN ID) such to allow UEs to access the network entity 304 according to one or the other network deployment types based on subscription information.

In an example, where the PLMN ID is used, a special PLMN ID indicating the deployment type of the network can be used. In another example, an AN ID can be encoded in existing SIB messages broadcasted by identifier broadcasting component 316 as part of the wireless communication service (e.g., as part of LTE) to indicate the deployment type of the network, where the SIB can include the AN ID as a new information element (IE), a reuse of an existing ID (e.g., PLMN ID in SIB1), etc. In one example, where PLMN ID is encoded using binary coded decimal, some combinations are not used, and as such, unused portions of the PLMN ID in SIB1 may be used to specify the AN ID. In yet another example, identifier broadcasting component 316 can use a cell ID or tracking area code to indicate the AN ID (e.g., where PLMN ID is not present).

In addition, method 400 includes, at Block 404, establishing a connection with a network based at least in part on the network identifier. Connection establishing component 312 can establish the connection with the network (e.g., network entity 304) based at least in part on the network identifier. For example, this can optionally include determining a deployment type of the network, at Block 408. As described further herein, the connection may be an unauthenticated connection that is established based on the deployment type of network. Thus, where the network deployment type is an LTE offload, LTE hotspot, etc. network, connection establishing component 312 may establish the unauthenticated connection to determine one or more subscriptions supported by the network, AAA server information, etc. to determine credentials for establishing an authenticated connection with the network (e.g., via an associated AAA server), and/or the like. Similarly, method 500 includes, at Block 504, establishing a connection with one or more UEs. Connection establishing component 318 can facilitate establishing the connection (e.g., whether authenticated or unauthenticated) with the one or more UEs (e.g., UE 106).

In another example, connection establishing component 312 can determine to establish the connection if the UE 106 is a member of a CSG advertised by network entity 304. Thus, it is to be appreciated that the connection establishing component 318 can verify whether the UE 106 is a member of a broadcasted CSG before establishing the connection therewith, in one example.

In an example, the connection established between connection establishing components 312 and 318 may be an unauthenticated connection over a radio resource control (RRC) layer or other layer 3 (e.g., where network entity 304 is an eNB), over a NAS layer (e.g., where network entity 304 is an MME), and/or the like. The purpose of the connection can be to obtain additional information regarding services provided and/or subscriptions supported by the network entity 304. Thus, the connection can offer limited services in this regard. Thus, for example, method 400 includes, at Block 406, querying, using the connection, the network for information related to establishing services at the network. Service querying component 314 can query, using the connection, the network (e.g., network entity 304) for the information related to establishing services at the network. This can include information regarding the services (e.g., an identification of the services), subscriptions supported (e.g., a type of credentials for accessing the services), and/or the like in a service query. In an example, service querying component 314 may formulate the query based at least in part on determining that such querying is supported by the network entity 304, which the network entity 304 may indicate in a broadcast message (e.g., SIB) or other signaling to the UE 106. Method 500 includes, at Block 506, providing service information to the one or more UEs. Service provisioning component 320 can provide the service information to the one or more UEs (e.g., UE 106). The service information may relate to services offered, subscription identifiers (or identifiers of subscription providers) supported, etc. to the UE 106, which can be based on a request received from the UE 106 or otherwise based on establishing the connection with the UE 106.

Thus, for example, a service discovery protocol (SDP) can be defined for communicating service and/or subscription information between the UE 106 and network entity 304. For instance, the network entity 304 is configured with one or more service providers and/or MNOs that provide access to the service provider network (e.g., network 104). Thus, service provisioning component 320 can provide information to the UE 106 regarding accessing the service provider network via the one or more subscription providers, such as subscription provider identification information (e.g., name, an icon, etc.), type of authentication used, AAA server information, availability of online signup or OSU server information, etc. based on a query received from service querying component 314. In one example, service provisioning component 320 can provide the information to the UE 106 (e.g., which can be received by service querying component 314) based at least in part on performing a domain name system (DNS) lookup to determine at least some of the information (e.g., AAA server information).

As described, SDP can be run over an RRC or NAS connection between UE 106 and network entity 304. When run over RRC, for example, connection establishing component 312 can establish the RRC connection via an RRC message with network entity 304, where the RRC message can use a cause code to indicate an SDP query (e.g., based on an indication from service querying component 314), in which case connection establishing component 318 can respond to the connection request with the SDP information (e.g., obtained from service provisioning component 320), which connection establishing component 312 can provide to service querying component 314. In another example, connection establishing component 312 can request the SDP information (e.g., based on an indication from service querying component 314) by using a newly defined RRC message that requests the SDP information, but may not actually establish an RRC connection with the network entity 304. In this example, connection establishing component 318 responds with a newly defined RRC message including the queried SDP information (e.g., received from service provisioning component 320) without establishing the connection. For example, the newly defined messages can be used after connection establishing component 312 receives a response (message 2) from connection establishing component 318 to an initial random access channel (RACH) request. The transaction can be assumed complete once the network entity 304 transmits the SDP response to the UE 106.

In any case, whether SDP is performed by RRC or NAS, it may be run once per network identifier observed by UE 106 to determine if the UE 106 has a valid subscription to access the related service provider network, or to provision a new subscription at a new/unrecognized service provider network. In addition, in an example, identifier broadcasting component 316 may broadcast service and/or subscription information (e.g., subscription identifiers) in the broadcast message with the network identifier (or another broadcast message) such that a connection need not be established with network entity 304 to receive the service and/or subscription information. In one example, subscription identifiers sent to the UE 106 in the SDP query response or in a broadcast message can indicate which subscription(s) or subscription provider(s) are valid and/or supported at the network entity 304 for accessing the service provider network (e.g., and/or for accessing portions thereof according to one or more policies related to the subscriptions or type of subscriptions). In this regard, for example, the UE 106 can determine whether it has credentials for the specific subscription provider in determining whether to access network entity 304 to receive one or more services, as described further herein.

In this regard, method 400 may optionally include, at Block 410, establishing an authenticated connection with the network based at least in part on the information. Connection establishing component 312 may establish the authenticated connection with the network based at least in part on the information. Similarly, method 500 may optionally include, at Block 508, establishing an authenticated connection with the one or more UEs based at least in part on the service information. Connection establishing component 318 may establish the authenticated connection with the one or more UEs based at least in part on the service information. For example, the authenticated connection can include a connection between the UE 106 and network entity 304 that is established based on a set of credentials. For example, the set of credentials may include at least one of subscription information of the UE 106 (e.g., where network entity 304 is or communicates with an LTE, LTE offload, or similar network entity), where the subscription information can be obtained from an HPLMN of the UE, credentials specified by the UE 106 (e.g., where network entity 304 is or communicates with an LTE hotspot that requests credentials and/or an online sign-up, as described herein), etc.

For example, establishing the authenticated connection with the network at Block 410 may optionally include, at Block 412, determining a set of credentials for the authenticated connection based on receiving information of one or more subscription providers. Connection establishing component 312 can determine the set of credentials for the authenticated connection based on receiving information of one or more subscription providers. For example, the information received at Block 406 may include the information of the one or more subscription providers, and may include an identifier of the subscription provider. This can enable the connection establishing component 312 to determine credentials associated with the subscription provider for attempting to establish the authenticated connection and/or a type of subscription or connection request to utilize.

As described, connection establishing component 312 may determine the credentials for the subscription provider based on a list of credentials stored for a plurality of subscription providers, which may include username/password or PIN values, security keys, etc. and/or may be stored by the connection establishing component 312 or other component of the UE 106. In this example, connection establishing component 312 may determine a deployment type of the network or subscription as related to LTE hotspot, and/or otherwise that the credentials expected are non-USIM credentials that can be validated by an AAA server that may not be part of an LTE EPC. In another example, connection establishing component 312 may determine the credentials for the subscription provider based on subscription information of the UE 106 (e.g., IMSI, security root key (Ki) or other USIM credentials), etc. For example, connection establishing component 312 may determine a type of the network or subscription as related to LTE or LTE offload, and/or otherwise that the credentials expected are USIM credentials that can be validated by an AAA server at an HPLMN of the UE 106. In another example (e.g., where connection establishing component 312 cannot locate credentials for the subscription), connection establishing component 312 may utilize an interface of the UE 106 to prompt for entry of credentials, which may be subsequently utilized in attempting to establish the authenticated connection. For example, connection establishing component 312 may display at least a portion of the related subscription or service information (e.g., the icon) using the interface of the UE 106.

Establishing the authenticated connection with the network at Block 410 may also optionally include, at Block 414, establishing an RRC layer connection with at least one of the one or more subscription providers based at least in part on the set of credentials. Connection establishing component 312 can establish the RRC layer connection with at least one of the one or more subscription providers based at least in part on the set of credentials. As described, the network may support multiple different types of subscriptions, and the connection establishing component 312 may select one or more of the subscriptions for which it has credentials (e.g., which may be stored in a list of credentials at the connection establishing component 312 or other component of UE 106). In one example, as described, determining the set of credentials at Block 412 may include connection establishing component 312 specifying credentials in signing-up for the subscription with the network, and thus establishing the RRC layer connection at Block 414 may be accomplished using the specified credentials. This may include generating a username/password, PIN, etc. combination using an interface of the UE 106, accepting terms and conditions specified for the network entity 304, etc.

In a specific example, network entity 304 may broadcast the network identifier (or other network identification information) via identifier broadcasting component 316 in an extended or adapted LTE or LTE Advanced in unlicensed spectrum, and identifier determining component 310 can obtain the identifier as broadcasted by network entity 304. For LTE hotspot networks, for example, non-USIM credentials may be used for authenticating UE 106, in which case the credentials are not associated with a PLMN ID or IMSI of the UE 106. In this regard, identifier broadcasting component 316 can broadcast a special PLMN ID (e.g., all zeros or another defined PLMN ID) for indicating LTE hotspot functionality (and/or can use a cell ID or tracking area code as an AN ID, as described). In addition, as described, identifier broadcasting component 316 may broadcast a CSG identifier as well to indicate private network access and/or to specify the AN ID. For example, the identifier broadcasting component 316 may utilize the CSG ID to indicate the AN ID where distinguishing between CSG and non-CSG cells is not needed.

In any case, identifier determining component 310 can receive the information and can allow connection establishing component 312 to select whether to establish connection with the network entity 304 as an LTE hotspot based on the information. For example, connection establishing component 312 may determine whether the information is at least partially within a configuration of networks from which to request access, where the connection establishing component 312 may store or otherwise access configurations of networks from which to request access. This configuration of networks may include a whitelist of CSG cells from which to request access, a blacklist of CSG cells from which to not request access, a preferred roaming list of PLMN IDs of networks, a list of AN IDs or other network identification information preferred for requesting access (e.g., as selected and/or specified using an interface of the UE 106), etc. In addition, connection establishing component 312 can determine the credentials for establishing the connection based on the deployment type of network and/or the configuration within which the network is located (e.g., CSG whitelist, preferred roaming list, AN list, etc.), as described above, and may accordingly attempt to establish the authenticated connection with the network. For an LTE hotspot subscription, for example, connection establishing component 312 can determine a username/password combination, PIN, an online sign-up mechanism, etc. as credentials for accessing the network, and may specify the credentials in attempting to establish the authenticated connection with the network.

In another example, network entity 304 can broadcast a network identifier (or other network identification information) to indicate LTE or LTE offload network, which may include indicating the PLMN ID of the related MNO in system information (e.g., SIB1). In this example, identifier determining component 310 can obtain the network identifier (or other network identification information), and connection establishing component 312 can determine the network entity 304 relates to an MNO based on the PLMN ID. Connection establishing component 312 can accordingly perform a connection procedure with the connection establishing component 318 as defined for the wireless communication service. This may include establishing a connection to determine supported subscription providers or may otherwise include establishing an authenticated connection using subscription information of the UE 106 (e.g., in LTE based on an IMSI, security root key, etc.). In this example, UE 106 may use the network entity 304 according to the wireless communication service, and may not query for additional provided services. It is to be appreciated that other PLMN IDs can be defined to indicate LTE offload for a given MNO, and thus the UE 106 connects to the network entity 304 as if it is connecting to the MNO normally upon encountering one of the defined PLMN IDs.

In one example, for LTE offload subscriptions indicated by network entity 304, connection establishing component 312 can utilize a different network selection mechanism than that used in selecting among LTE subscriptions. For example, connection establishing component 312 may use mechanisms similar to access network discovery and selection function (ANDSF) in WLAN and/or preferred service provider list (PSPL) rules to discover and rank or select LTE offload subscriptions discovered for one or more networks. In an example, the PSPL rules can specify certain locations of the UE 106 and/or times during which different subscriptions may be ranked or otherwise preferred over other subscriptions (e.g., to distribute usage in peak locations/hours). In any case, connection establishing component 312 can consider received subscription information for one or more networks against a preferred list of subscriptions to determine one or more subscriptions over which to establish an authenticated connection, as described.

FIG. 6 illustrates an example system 600 depicting message flow between a UE 106, eNB 108, and MME 112 in accordance with aspects described with respect to FIGS. 3-5 above. At 602, eNB 108 can broadcast SIBs that may include a network identifier (e.g., in a PLMN ID or other newly defined or reused IE, a CSG identifier if applicable, etc.), which the UE 106 can receive to determine a deployment type of the network. Based at least in part on the network identifier, the UE 106 detects a LTE-U-W deployment, and that additional information regarding services offered, subscriptions accepted, etc., can be obtained to access the network at 604. In this regard, UE 106 establishes an RRC connection with the eNB 108 at 606. The RRC connection at 606 may optionally indicate an SDP query cause code. eNB 108 accordingly allows UE 106 to establish an unauthenticated connection to obtain information regarding network services. In one example, as described, eNB 108 may obtain the information regarding network service, and return the information to UE 106 without the UE 106 communicating with MME 112 over NAS. In another example, however, UE 106 can optionally send an SDP query over NAS (e.g., as a NAS message) using the unauthenticated connection at 608 including a request for information for service discovery to MME 112 to determine network authentication types, OSU provider information, etc. supported at the network. In one alternative, the SDP signaling is transported over generic NAS transport, an example of which can include the generic NAS transport of third generation partnership (3GPP) technical specification (TS) 24.301. For example, a new type of Generic NAS transport "SDP" may be defined for the receiving NAS layer to be able to provide the receiving message to the correct sublayer (SDP/Service Discovery). Alternatively, a new NAS SDP request/response pair of messages may be used to request/receive the SDP information between the UE 106 and MME 112. The MME 112 returns a SDP response at 610, which may include the Network Authentication Type and OSU Providers List elements to UE 106, as described. The UE 106 may optionally request/receive additional SDP information at 612, such as an OSU Provider Icon of the desired size in pixels in order to display the information to the user for provider selection, etc. In addition, as described, the UE 106 can use the retrieved SDP information to determine a subscription for establishing an authenticated connection with the MME 112 (or eNB 108), to display at least a portion of the SDP information on an interface to allow selection of the subscription, etc.

FIG. 7 illustrates an example method 700 for establishing an authenticated connection with a network entity based on determined subscription information for the network entity. Method 700 includes, at Block 702, determining one or more network identifiers associated with a network entity. Identifier determining component 310 can determine the one or more network identifiers (or other network identification information) associated with the network entity (e.g., network entity 304). The one or more network identifiers may include a PLMN ID or other public network ID, AN ID, CSG ID or other private network ID, etc. In one example, identifier determining component 310 may receive an indication of the network identifier (or other network identification information) from the network entity 304, which may include receiving the indication of the network identifier in system information (e.g., a SIB) from the network entity 304.

Method 700 further includes, at Block 704, determining one or more subscription providers associated with the one or more network identifiers. Connection establishing component 312 can determine the one or more subscription providers associated with the one or more network identifiers. In one example, connection establishing component 312 can receive the one or more subscription providers in configuration information related to the network entity 304, which may be provisioned to the UE 106 by the network entity 304 or other nodes of the wireless network (e.g., as received by service querying component 314), stored in a memory by the UE 106 (e.g., in a USIM or other persistent, non-persistent, or semi-persistent memory, etc.), and/or the like. In one example, as described, determining the one or more subscription providers at Block 704 may optionally include, at Block 706, querying the network entity for information regarding the one or more subscription providers. For example, service querying component 314 may query the network entity 304 (e.g., using a RRC or NAS query depending on whether the network entity 304 is an eNB or MME, as described) for information regarding the one or more subscription providers at least in part by performing an SDP query to the network entity 304 or other network entities, and receiving the information in response thereto. For example, the service querying component 314 may perform the SDP query periodically, based on detecting occurrence of one or more events, etc.

Method 700 also includes, at Block 708, determining a set of credentials for establishing an authenticated connection with the network entity based on determining the one or more subscription providers. Connection establishing component 312 can determine the set of credentials for establishing the authenticated connection with the network entity based on determining the one or more subscription providers. As described, for example, connection establishing component 312 may determine the set of credentials based at least in part on one or more lists of subscriptions and associated credentials stored by the UE 106, by determining credentials specified in an online sign-up with the network entity 304, etc.

Method 700 includes, at Block 710, establishing an authenticated connection with the network entity using one or more of the subscription providers based at least in part on the set of credentials. Connection establishing component 312 can establish, or at least attempt to establish, the authenticated connection with the network entity using one or more of the subscription providers and based at least in part on the set of credentials. Accordingly, for example, connection establishing component 312 may transmit a message to network entity 304 to establish the connection, and may include the set of credentials specific to the associated subscription. Network entity 304 may accordingly verify the credentials and establish or deny the authenticated connection with the UE 106.

Figure 8:
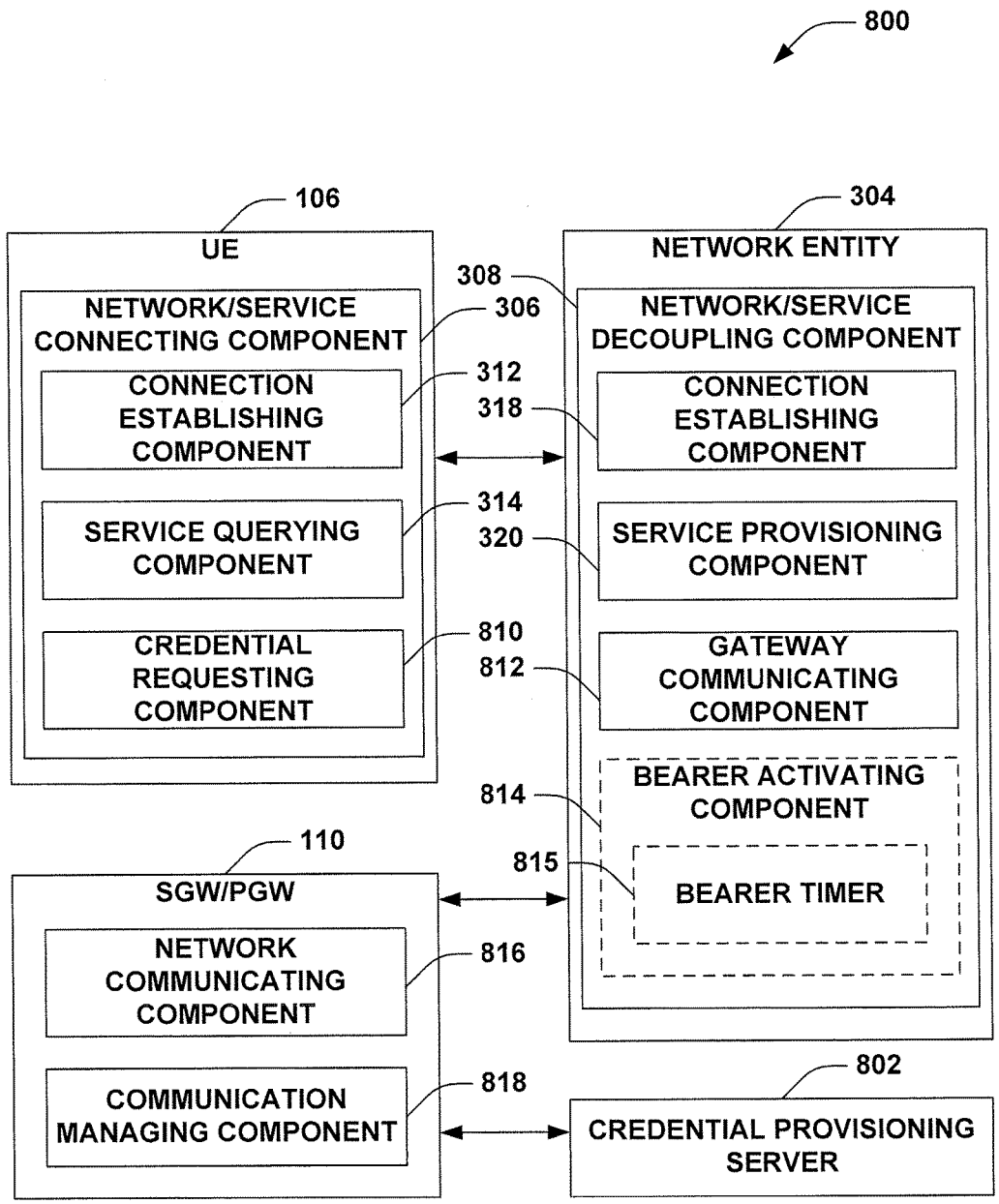
FIG. 8 illustrates an example system for provisioning credentials for accessing available wireless network services in accordance with aspects described herein.
Figure 9:
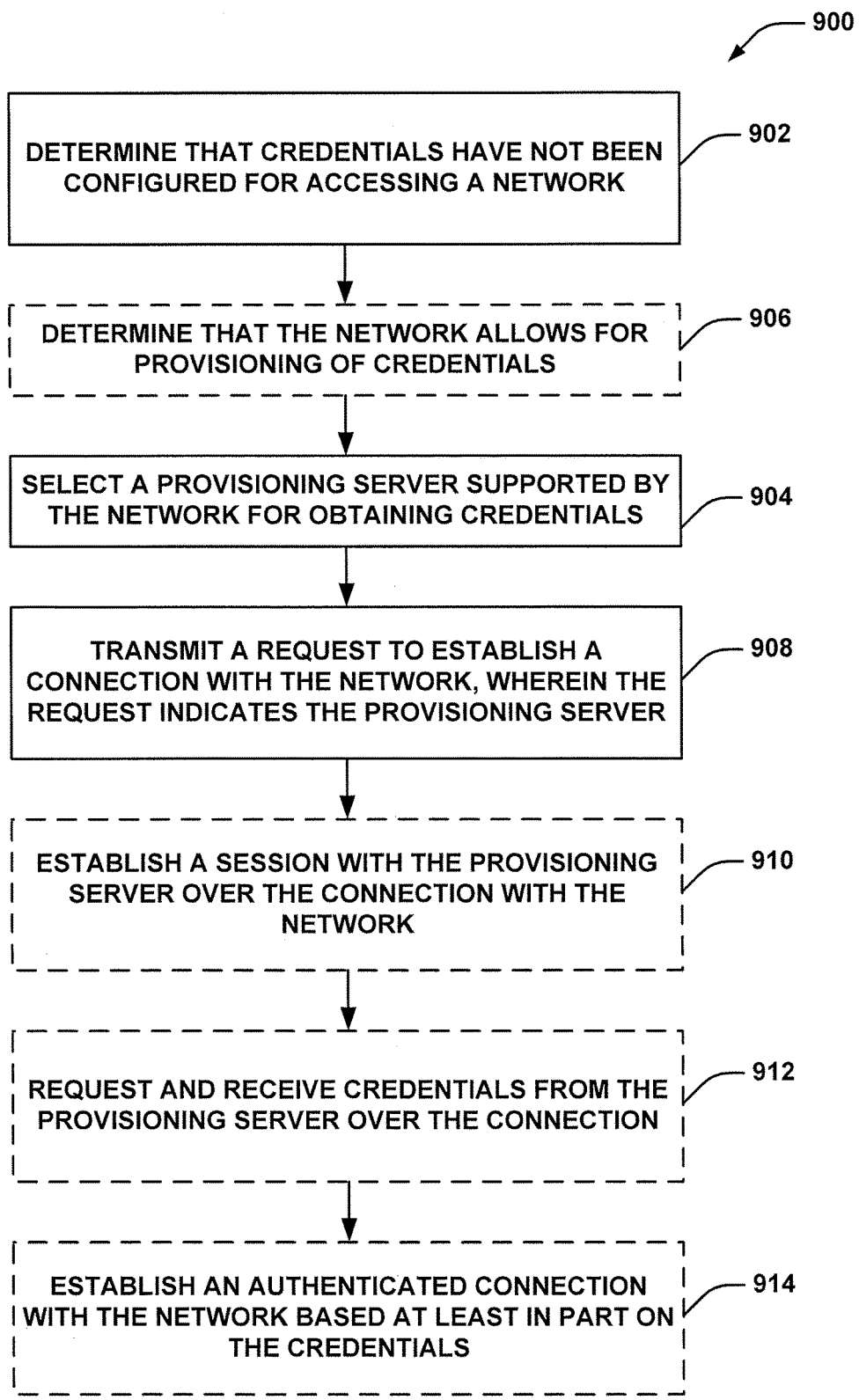
FIG. 9 illustrates an example method for obtaining provisioned credentials for accessing wireless network services in accordance with aspects described herein.
Figure 10:
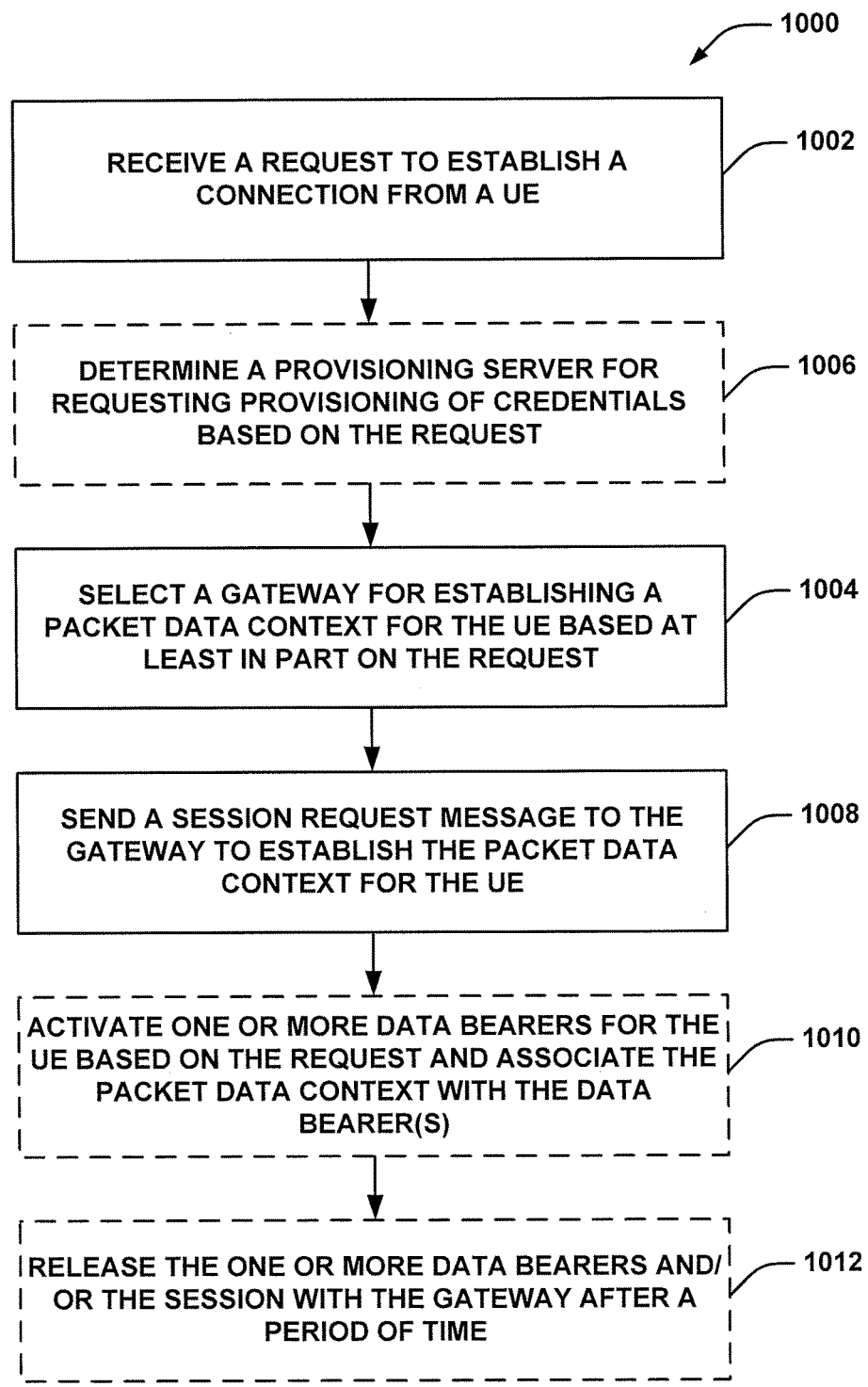
FIG. 10 illustrates an example method for providing credentials for accessing wireless network services in accordance with aspects described herein.
Figure 11:
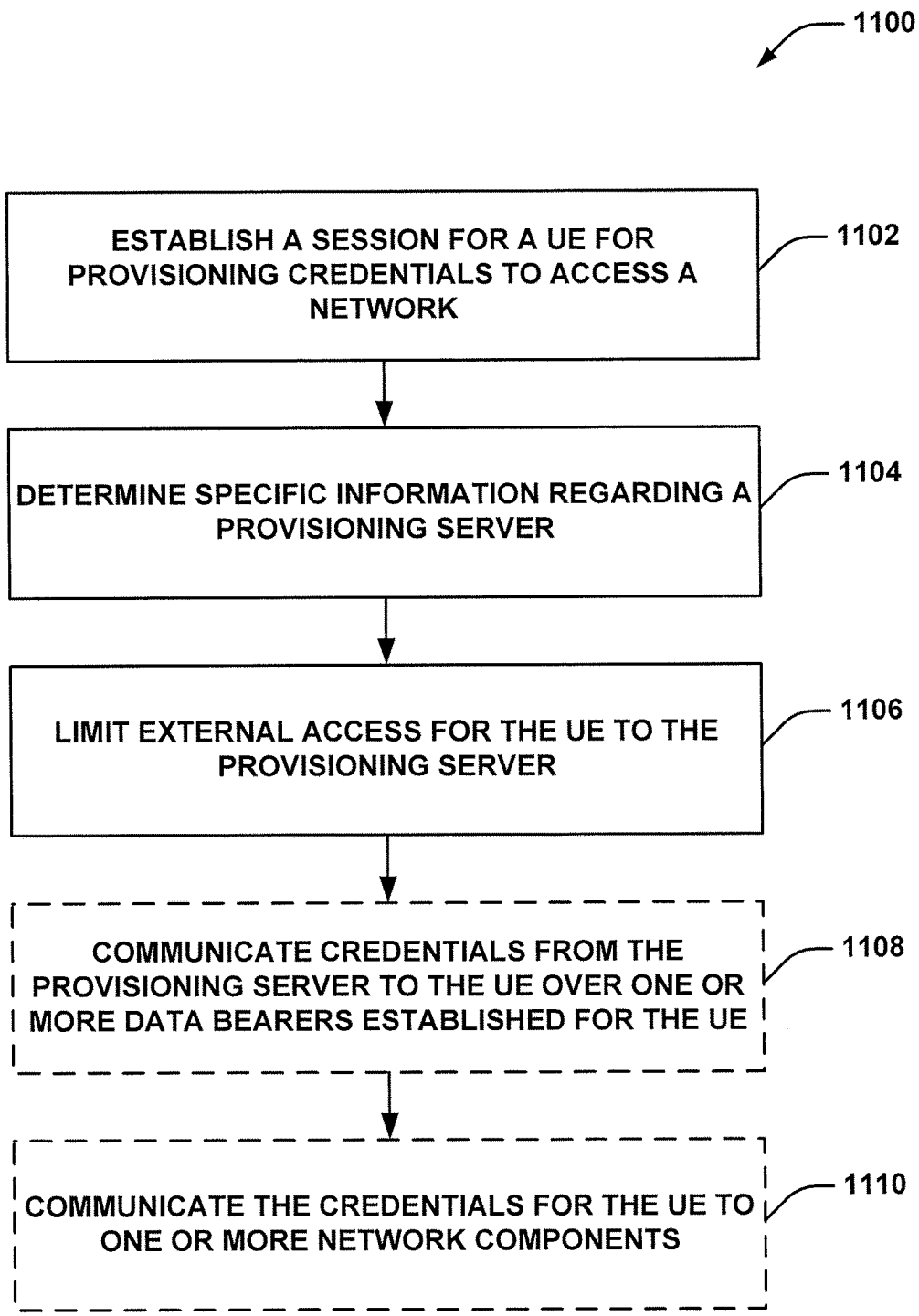
FIG. 11 illustrates an example method for providing credentials for accessing wireless network services in accordance with aspects described herein.

Turning now to FIGS. 8-11, additional aspects of the present apparatus and method are depicted with reference to one or more components and one or more methods that may perform the actions or functions described herein. Although the operations described below in FIGS. 9-11 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 8 depicts a system 800 for provisioning credentials for accessing a wireless network. System 800 includes a UE 106 that communicates with a network entity 304 to request credentials for accessing network services, as described herein. Network entity 304 can communicate with one or more network components to obtain credentials for the UE 106, such as a SGW/PGW 110 and/or a credential provisioning server 802 (e.g., via the SGW/PGW 110).

UE 106 may include a network/service connecting component 306, as described, for determining network identification information and/or service identification information related to network entity 304. For example, network/service connecting component 306 may include a connection establishing component 312 for establishing a connection with the network entity based at least in part on the network identification information, a service querying component 314 for querying the network entity for a serving provider related thereto, as described herein, and a credential requesting component 810 for requesting credentials (e.g., from a provisioning server) for establishing the connection. It is to be appreciated that the network/service connecting component 306 may include additional components, which may be omitted from this Figure for ease of explanation.

Network entity 304 may include a network/service decoupling component 308 for separately signaling network identification information and/or related service identification information, as described. Network/service decoupling component 308 may include a connection establishing component 318 for facilitating connection establishment with one or more UEs, a service provisioning component 320 for provisioning service information (e.g., an indication of a service provider) to the one or more UEs, a gateway communicating component 812 for communicating with one or more gateway nodes to access a credential provisioning server, and/or an optional bearer activating component 814 for activating one or more bearers for the UE based on establishing an authenticated connection for the UE. It is to be appreciated that the network/service decoupling component 308 may include additional components, which may be omitted from this Figure for ease of explanation.

SGW/PGW 110 may include a network communicating component 816 for communicating with one or more network nodes, and a communication managing component 818 for limiting access for communicating with the one or more network nodes.

FIG. 9 depicts an example method 900 for requesting credentials for accessing network services. FIG. 10 illustrates an example method 1000 for communicating with a gateway to obtain credentials for a UE. FIG. 11 shows an example method 1100 for communicating with a provisioning server to obtain credentials for a UE. As described above, UE 106 includes a connection establishing component 312 for establishing a connection with network entity 304, which has connection establishing component 318 for performing the connection establishment with UE 106. The connection can be established as an unauthenticated connection to allow the UE 106 to obtain information regarding network services and/or related subscription provider information supported by a network to which network entity 304 relates. In this regard, service querying component 314 can query the network entity 304 for the information, and service provisioning component 320 can communicate related information to the UE 106.

Method 900 of FIG. 9 includes, at Block 902, determining that credentials have not been configured for accessing a network. For example, service querying component 314 (FIG. 8) can determine that credentials have not been configured for accessing the network. For example, service querying component 314 may determine that the UE 106 does not have or has not received credentials to access one or more of the network services from network entity 304, and can seek to obtain provisioning of credentials to access the network services. In one example, service querying component 314 can determine that the UE 106 does not have the credentials based at least in part on identifying services received from the network entity 304, subscription providers associated with network entity 304, etc., which may be received in one or more identifiers from the network entity 304 as described, and searching a data store or other memory at the UE 106 (or accessible by the UE 106) for credentials related to the services, subscription providers, etc. In another example, service querying component 314 can determine that the UE 106 does not have the credentials based at least in part on connection establishing component 312 attempting to access the network entity 304 to utilize the network services, and/or the like, and receiving a rejection for the attempt to access.

In any case, where credentials have not been received for accessing the network, method 900 includes, at Block 904, selecting a provisioning server supported by the network for obtaining credentials. For example, credential requesting component 810 can select the provisioning server supported by the network for obtaining the credentials. Credential requesting component 810 may select the provisioning server based on determining information identifying the provisioning server, which can be received by service querying component 314 in the information regarding the network service and/or supported subscription providers. It is to be appreciated that UE 106 can additionally or alternatively store information identifying the provisioning server in a memory. In an example, credential requesting component 810 selects a provisioning server related to a desired subscription provider (and/or can more generally select the subscription provider). This can be based on a selection received from an interface from UE 106, a default selection (e.g., based on parameters or preferences stored in UE 106), a random or pseudo-random selection, etc.

Method 900 may optionally include, at Block 906, determining that the network allows for provisioning of credentials. Credential requesting component 810 may determine that the network allows for provisioning of credentials. For example, this can be based on the credential requesting component 810 identifying related subscription providers indicated in the service information and determining that online provisioning of credentials (e.g., provisioning of credentials over the network) is supported for the subscription providers (e.g., based on a stored list of subscription providers), or otherwise obtaining an indication that online provisioning is supported (e.g., in service information, broadcasted with the network identifier, and/or the like). Thus, in an example, selecting the provisioning server at Block 904 may be based at least in part on determining that the network allows for provisioning of credentials.

Method 900 further includes, at Block 908, transmitting a request to establish a connection with the network, wherein the request indicates the provisioning server. For example, credential requesting component 810 can generate and transmit the request to establish the connection with the network, wherein the request indicates the provisioning server (e.g., and/or the related subscription provider). Connection establishing component 312 can attempt to establish a connection with network entity 304 by transmitting the request thereto. It is to be appreciated that the network entity 304 to which the UE 106 transmits the request may be different from the network entity 304 from which the network service information and/or supported subscription provider information is received, in one example. In an example, the request can include a NAS message, which can be an attach request or other existing NAS message, which may have a new IE indicating provisioning is expected, a newly defined NAS message indicating provisioning is to be performed, etc. Moreover, in an example, the request may include an IMSI or other substantially unique identifier of the UE 106. In one example, credential requesting component 810 may use an International Mobile Station Equipment Identity (IMEI) in the request or otherwise when establishing the connection with network entity 304. Moreover, in some examples, the request to establish the connection may identify the provisioning server from which to obtain the credentials to access the network. For example, the request may indicate an access point name (APN) that represents the provisioning server (or more generally a related network service of the network entity 304 and/or the network associated therewith), a new IE indicating the provisioning server, a provisioning server index or identifier, a type of provisioning server, a default provisioning server, etc. In any case, the network entity 304 can determine the provisioning server to utilize in provisioning credentials to the UE 106 based at least in part on the request (e.g., by matching the provisioning server or corresponding network service indicated in the APN, information in the new IE, the server index or identifier, the server type, etc. with the corresponding provisioning server, such as credential provisioning server 802, as described further herein).

Method 1000 of FIG. 10 includes, at Block 1002, receiving a request to establish a connection from a UE. Connection establishing component 318 can receive the request to establish the connection from the UE (e.g., UE 106). For example, the request may relate to the request transmitted by the UE 106 at Block 908, and thus may include an attach request or other NAS message that may also request provisioning of credentials. Thus, the request can be a request to establish a connection with network entity 304 for the purposes of receiving credentials for accessing an associated network, as described. In one example, it is to be appreciated that the connection can include an unauthenticated connection that may have been established to receive the network service information and/or subscription provider information from the network entity 304, as described. An identification of the provisioning server can be sent from the UE 106 to the network entity 304 in the connection request and/or otherwise while the connection is still open (e.g., based on receiving the network service and/or subscription provider information). In any case, connection establishing component 318 can determine that the connection request is for the purpose of provisioning credentials. For example, connection establishing component 318 may determine this based on information that can be included in the request, as described above, such as an identified provisioning server (e.g., based on an APN, a new IE, a server index or identifier that identifies the provisioning server), an identified type of provisioning server, an indication to use a default provisioning server, a special type of NAS message or IE in the NAS message, that indicates provisioning is to be performed, etc. Moreover, connection establishing component 318 can allow the connection with the UE 106, and may not enable security for the connection such to maintain an unauthenticated connection, allowing the unauthenticated UE 106 to obtain credentials for accessing services provided by the network. In this regard, for example, connection establishing component 318 accepts the request and/or can indicate (e.g., to the UE 106 in a response to the request) that the connection is temporary and/or is otherwise restricted to provisioning of the credentials. In one example, it is to be appreciated that acceptance of the request as indicated by the connection establishing component 318 may indicate that the connection is temporary and/or is otherwise restricted to provisioning of the credentials.

Method 1000 includes, at Block 1004, selecting a gateway for establishing a packet data context for the UE based at least in part on the request. For example, network entity 304 includes the gateway communicating component 812 for selecting the gateway for establishing the packet data context for the UE based at least in part on the request. In an example, the gateway can be a default gateway for provisioning credentials to UEs. In another example, method 1000 may optionally include, at Block 1006, determining a provisioning server for requesting provisioning of credentials based on the request, and selecting the gateway at Block 1004 may be based at least in part on the determined provisioning server. Connection establishing component 318 may determine the provisioning server for requesting provisioning of the credentials based on the request. For example, as described, the provisioning server may be identified in the request (e.g., based on an APN, an IE in the NAS message indicating the provisioning server, a server index or identifier, a type of provisioning server, etc.). In any case, in this example, gateway communicating component 812 may select the gateway based on the determined provisioning server, provisioning server type, etc. In one example, gateway communicating component 812 can store, or can otherwise access, a repository in a data store or other memory that associates provisioning servers with related gateways that can provide access to the provisioning servers. In another example, where the request does not specify a provisioning server or otherwise specifies an indication to request provisioning from a default provisioning server, gateway communicating component 812 can select a gateway that can access a default provisioning server. In this regard, gateway communicating component 812 can determine the appropriate gateway for the indicated provisioning server (e.g., credential provisioning server 802), which may include SGW/PGW 110 in the depicted example. In addition, for example, gateway communicating component 812 can deactivate access to other gateways (not shown) for UE 106 to restrict access while the UE 106 is not yet authenticated.

Method 1000 also includes, at Block 1008, sending a session request message to the gateway to establish the packet data context for the UE. Thus, for example, gateway communicating component 812 sends the session request message to the gateway (e.g., SGW/PGW 110) to establish the packet data context for the UE (e.g., for accessing the provisioning server indicated in the connection request from the UE 106). In one example, gateway communicating component 812 can indicate to SGW/PGW 110 that the session for the UE 106 is limited to communicating with the particular provisioning server (e.g., such that the gateway can control traffic to the provisioning server for such purposes). When the packet data context is established based on the create session request message (e.g., as a packet data network connection), network entity 304 can communicate with the SGW/PGW 110 over the packet data context in a PDN on behalf of the UE 106. As described, in one example, it is to be appreciated that the connection request from the UE 106 can instead indicate the desired subscription provider, from which the gateway communicating component 812 can determine the corresponding gateway and/or provisioning server, and can accordingly send the session request to the gateway.

Method 1100 of FIG. 11 includes, at Block 1102, establishing a session for a UE for provisioning credentials to access a network. SGW/PGW 110 can include a network communicating component 816 for establishing the session for the UE for provisioning credentials to access the network. For example, network communicating component 816 may receive the request from one or more network components, such as network entity 304, and the request may include a session request sent by gateway communicating component 812 (e.g., at Block 1008). In one example, the request may indicate a provisioning server, a related subscription provider, other indication that the session is for provisioning credentials to a UE, additional specific information regarding the network service provider, and/or the like. Network communicating component 816 may grant the request for the purposes of requesting provisioning of credentials, as described herein. In one example, network communicating component 816 can provide a context to the network entity 304 for requesting provisioning of credentials for one or more UEs. Thus, for example, as part of establishing the session, network communicating component 816 may transmit a create session response to the network entity 304 indicating that the request is granted. Thus, method 900 may optionally include, at Block 910, establishing a session with the provisioning server over the connection with the network. Credential requesting component 810 can establish the session with the provisioning server (e.g., credential provisioning server 802) over the connection with the network (e.g., network entity 304), which may be based on the session established with the network entity 304 by the network communicating component 816.

Method 1100 further includes, at Block 1104, determining specific information regarding a provisioning server. For example, SGW/PGW 110 includes communication managing component 818 for determining the specific information regarding the provisioning server. In one example, as described, communication managing component 818 can determine the provisioning server, a related subscription provider, etc., from the session request received from network entity 304. In addition, in an example, communication managing component 818 may determine information specific to the UE 106 from the session request, and may use this information in determining an associated provisioning server. In yet another example, communication managing component 818 may determine a default provisioning server, a provisioning server based on a type of provisioning server specified in the request, etc. Moreover, for example, network communicating component 816 may explicitly request specific information of the network service provider and/or UE 106 from network entity 304 after establishing the session therewith, which may include a request to a DNS server to identify the provisioning server.

Method 1100 includes, at Block 1106, limiting external access for the UE to the provisioning server. For example, communication managing component 818 may limit external access for the UE (e.g., UE 106) to the provisioning server (e.g., credential provisioning server 802). In this regard, communication managing component 818 can allow communications with credential provisioning server 802 for the given session with the network entity 304 that is associated with the packet data context, but can forbid access requests for other nodes or gateways accessible by SGW/PGW 110 in the given session. In addition, method 1000 may include, at Block 1010, activating one or more data bearers for the UE based on the request and associating the packet data context with the one or more data bearers. Thus, for example, bearer activating component 814 can activate the one or more data bearers for the UE (e.g., UE 106) based on the request and can associate the packet data context with the one or more data bearers. In an example, activating the one or more data bearers may include indicating activation of the one or more data bearers to the UE 106 when the packet data context is established (e.g., based on receiving the create session response to the session request message transmitted to the SGW/PGW 110 that indicates establishment of the packet data context). Bearer activating component 814 associates the data bearer(s) with UE 106 such that communications from the data bearer(s) (e.g., received over the packet data context) can be sent to UE 106 over one or more radio bearers with an eNB and/or information from UE 106 may be sent over the packet data context.

Accordingly, for example, method 900 may optionally include, at Block 912, requesting and receiving credentials over the connection. Credential requesting component 810 can request and receive the credentials over the connection. For example, where the packet data context and associated bearer(s) are established for the UE 106 (which may be indicated in a NAS message from network entity 304, such as an attach response), credential requesting component 810 can transmit a request for credentials to credential provisioning server 802 over the one or more bearers. For example, this request may occur over Hypertext Transfer Protocol Secure (HTTPS), Open Mobile Alliance (OMA) Device Management (DM), Simple Object Access Protocol (SOAP) eXtensible Markup Language (XML), etc. Based on the request, for example, credential provisioning server 802 can obtain credentials for the UE 106. In one example, the credentials can be provisioned based at least in part on information previously provided by the UE 106 (e.g., to credential provisioning server 802 or other components of the network) such as registration information (e.g., input on the UE 106), username/password combination, request for a certificate, payment information, acceptance of terms/conditions, and/or the like.

In this regard, method 1100 may include, at Block 1108, communicating credentials from the provisioning server to the UE over one or more data bearers established for the UE. Thus, network communicating component 816 can communicate the credentials from the provisioning server (e.g., credential provisioning server 802) to the UE (e.g., UE 106) over the one or more data bearers established for the UE that may be related to the packet data context. Gateway communicating component 812 receives the credentials over the one or more data bearers, and sends the credentials to the UE 106 over the connection established via connection establishing component 318 (e.g., over a radio bearer for the UE 106). Credential requesting component 810 can receive the credentials from the provisioning server over the connection with the network entity 304. Method 900 may optionally include, at Block 914, establishing an authenticated connection with the network based at least in part on the credentials. Thus, as described further herein, connection establishing component 312 can establish the authenticated connection with the network (e.g., with network entity 304) based at least in part on the credentials.

Method 1100 can also optionally include, at Block 1110, communicating the credentials for the UE to one or more network components as well. In this example, network communicating component 816 can communicate the credentials for the UE (e.g., UE 106) to the one or more network components. For example, the one or more network components may include an AAA server, a HSS, etc. (not shown) for updating such that the AAA server, HSS, etc. can subsequently authenticate a connection request from the UE 106.

In addition, method 1000 may optionally include, at Block 1012, releasing the one or more data bearers and/or the session with the gateway after a period of time. For example, bearer activating component 814 can release the one or more data bearers and/or gateway communicating component 812 can release the session with the gateway (e.g., SGW/PGW 110) after the period of time. In one example, bearer activating component 814 can deactivate the one or more bearers and/or gateway communicating component 812 can terminate the session with PGW/SGW 110 after the period of time, which can be measured from the time of bearer activation and/or session initiation. For example, the period of time can represent a time after which it is determined that the UE 106 should have received provisioned credentials. In this regard, for example, bearer activating component 814 can initialize a bearer timer 815 based on activating the one or more data bearers. After the bearer timer 815 expires, the bearers and/or session are released, and the UE 106 can be required to reestablish the connection with network entity 304 using provisioned credentials. If the UE 106 did not receive the credentials, it can reestablish the unauthenticated connection with network entity 304 to obtain the credentials, though it is to be appreciated that a number of attempts to obtain credentials may be limited for a specific UE 106 over a period of time.

For example, where the UE 106 includes an IMEI or other identifier in connection requests for provisioning, bearer activating component 814 can track a number of requests for a given UE based on its identifier over a period of time, and where the number of requests achieves a threshold within a period of time or otherwise, bearer activating component 814 can reject the bearer establishment for the UE 106, and/or connection establishing component 318 can reject the initial connection establishment request before bearer establishment would occur. In addition, in an example, it is to be appreciated that UE 106 can indicate to the network entity 304 that credentials are successfully received and/or that the authenticated connection is successfully established, which may prompt the bearer activating component 814 to release the one or more data bearers and/or gateway communicating component 812 to release the session with the gateway.

Figure 12:
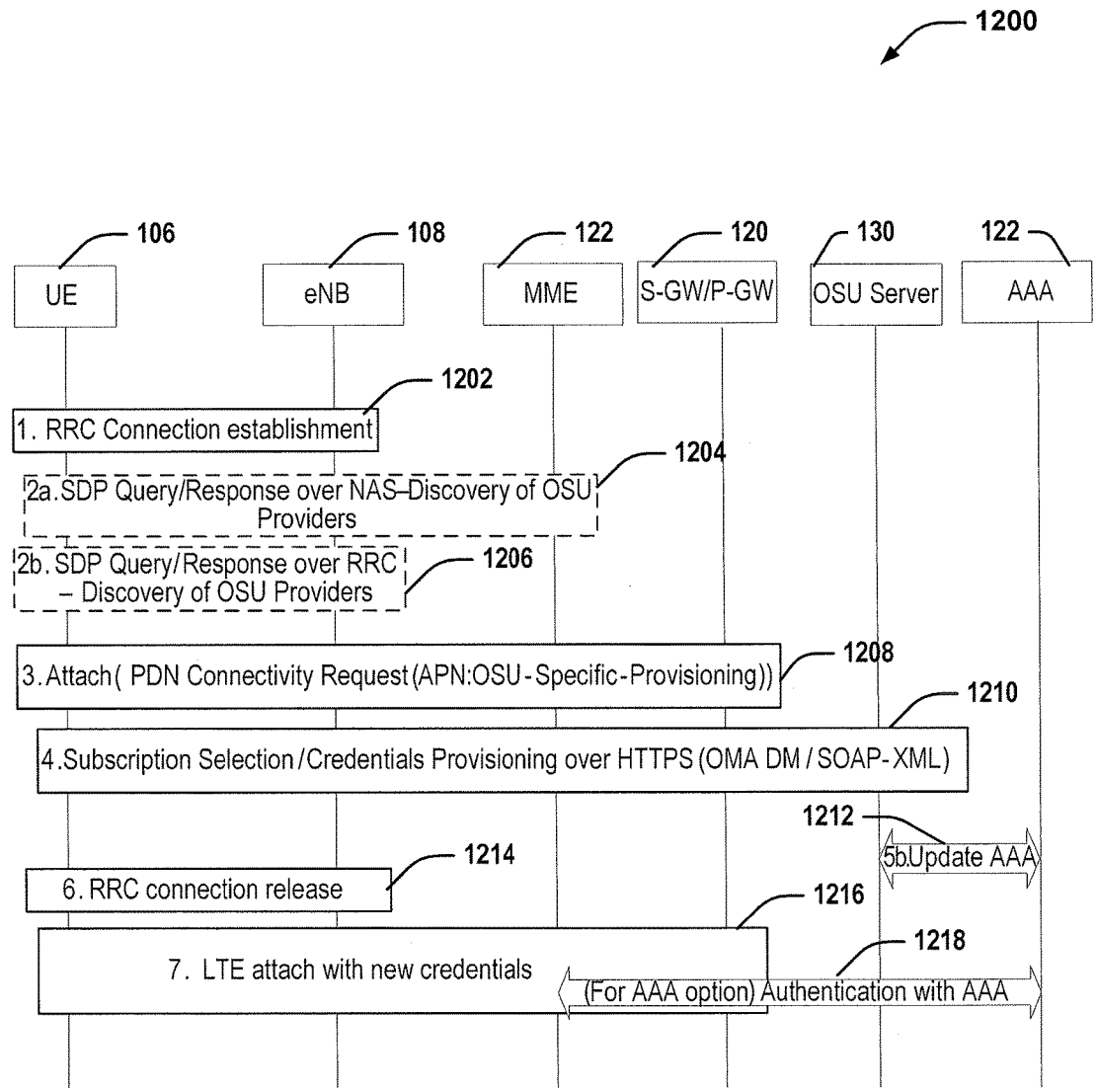
FIG. 12 illustrates an example system for provisioning credentials for accessing available wireless network services in accordance with aspects described herein.

FIG. 12 illustrates an example system 1200 depicting message flow between a UE 106, eNB 108, MME 112, SGW/PGW 110, OSU server 130, and AAA 122 in accordance with aspects described with respect to FIGS. 8-11 above. At 1202, UE 106 establishes an RRC connection with eNB 108. As described, this can be an unauthenticated RRC connection for obtaining provisioning of credentials for accessing services provided by the network. UE 106 obtains, via SDP query/response, network authentication type and information regarding OSU server 130, which may be a supported provisioning server, as described above. This may be optionally performed (a) with MME 112 over NAS at 1204, (b) with eNB 108 over RRC at 1206, etc. In either case, UE 106 can perform an attach procedure indicating that the UE 106 is seeking online provisioning of credentials. This may be indicated by the use of a specific known APN, e.g. "Provisioning," the use of a known specific IMSI (e.g., all zeros), the use of an APN created based on the OSU service provider, etc. It can additionally or alternatively be indicated by defining a new evolved packet system (EPS) attach type value: "EPS attach for provisioning." It may also be indicated by the transmitting a new NAS message for the purpose of provisioning, by including a new IE indicating the provisioning server, a provisioning server index or identifier, a type of provisioning server, or a default provisioning server, etc., and/or the like.

At 1208, MME 112 proceeds with establishing a non-authenticated non-secure PDN connection with a SGW/PGW 110, where the connection is restricted to provisioning. In this regard, MME 112 can send a Create Session Request message to the SGW/PGW 110 indicating that the session is for the purpose of provisioning. The message may also include the service provider from which provisioning is allowed, and/or specific information about the allowed provisioning server(s), e.g., DNS name, internet protocol (IP) address, etc. The SGW/PGW 110 can accept the request by sending a Create Session Response to MME 112. MME 112 can then initiate default EPS bearer activation towards the eNB 108 and UE 106. MME 112 may start a timer (e.g., bearer timer 815) based on initiating the EPS bearer activation, upon expiration of which the MME 112 may release the connection. For example, when MME 112 releases the connection, MME 112 may request the UE 106 to detach and reattach so that the UE 106 uses the provisioned credentials. Alternatively, the timer expiration may be interpreted as UE 106 failure to obtain credentials with the OSU server 130. If the provisioning was done through the use of an OSU service provider specific APN, the MME 112 may reject connection requests to such APN after a number of attempts. In any case, UE 106 can identify itself in the attach message, even if it is not using an identifier that is valid for registration in this network. For example, UE 106 may identify itself by using its IMEI, a new type of identity value (similar to media access control (MAC) address) for LTE-U capable devices, etc., in the EPS mobile identity IE in the attach request.

At 1210, once the UE 106 is attached to the SGW/PGW 110 and thus has one or more data bearers with eNB 108 for communicating with MME 112, SGW/PGW 110, etc., UE 106 initiates the Subscription selection and credentials provisioning with the OSU Server 130, which may occur over secure mechanism, such as HTTPS, OMA DM SOAP XML, etc. Upon successful provisioning of the UE 106, the OSU server 130 may update other network nodes about this new subscription information (e.g., AAA 122 in a hotspot deployment, an HSS in an offload deployment, etc.) at 1212. At 1214, the RRC connection can be released, and at 1216, UE 106 can establish a new RRC connection and can perform an attach procedure with the network using the new set of credentials. The AAA 122 can authenticate the UE 106 based on the credentials at 1218, as described herein.

Figure 13:
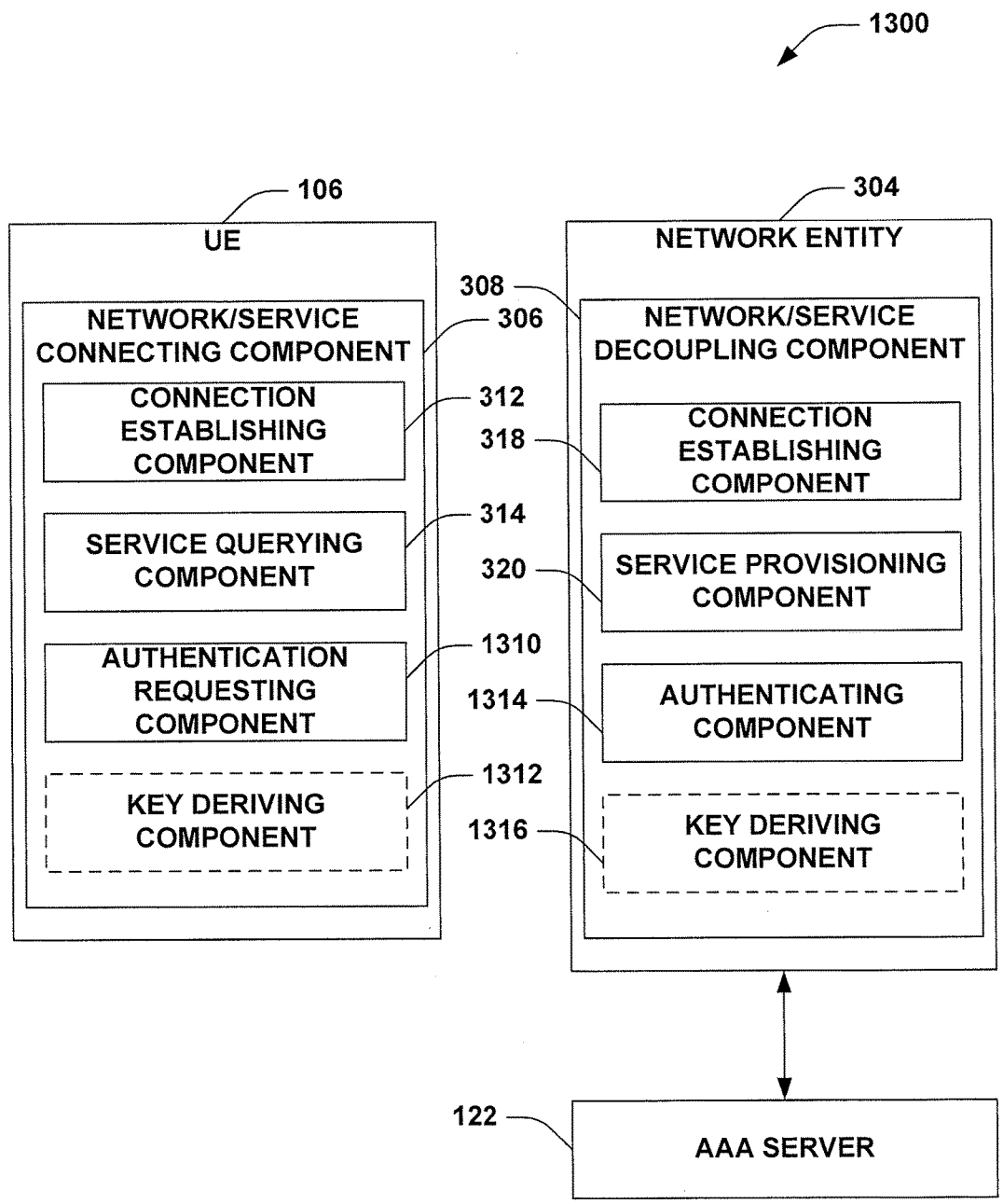
FIG. 13 illustrates an example system for authenticating devices for accessing available wireless network services in accordance with aspects described herein.
Figure 14:
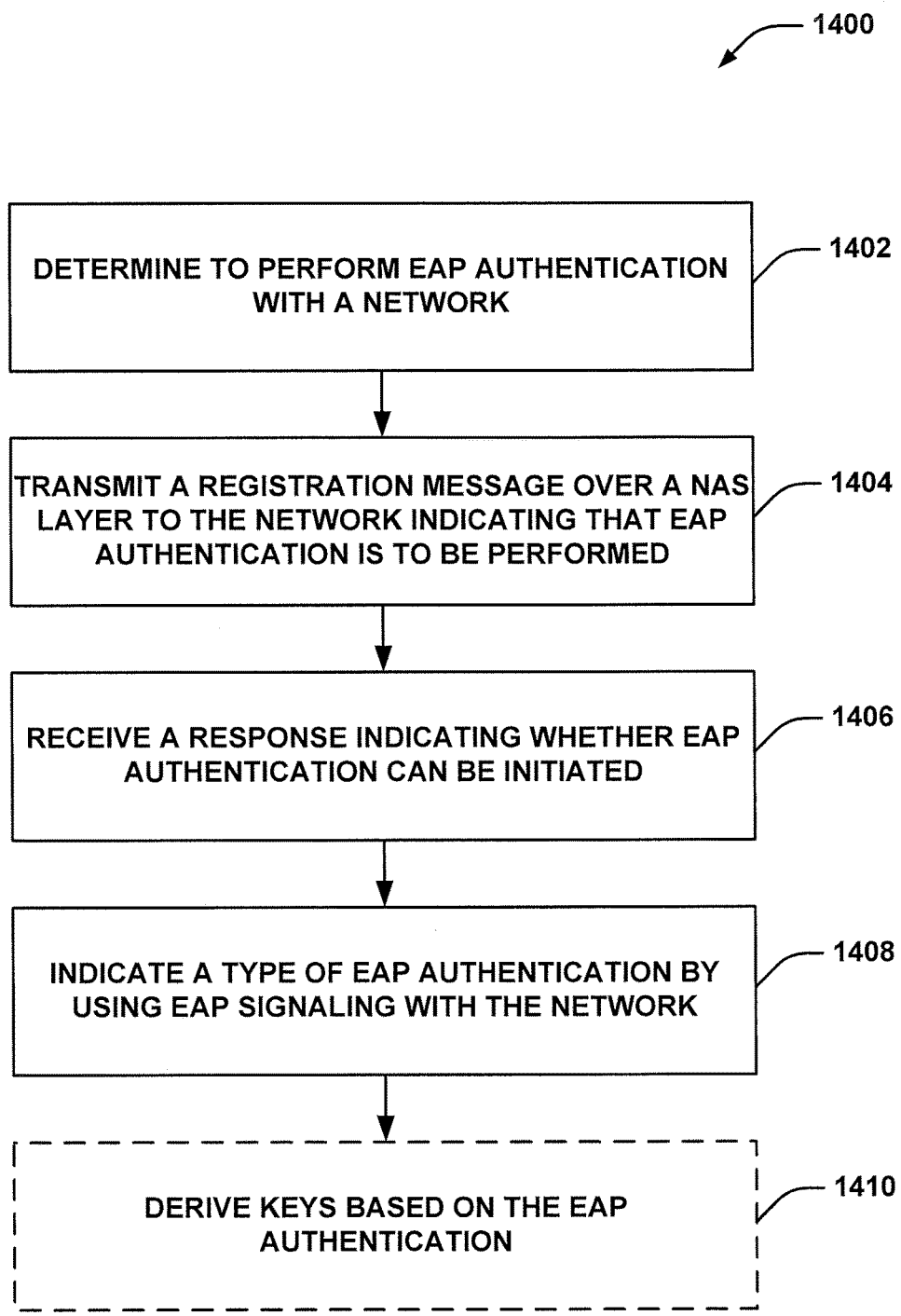
FIG. 14 illustrates an example method for requesting authentication for accessing wireless network services in accordance with aspects described herein.
Figure 15:
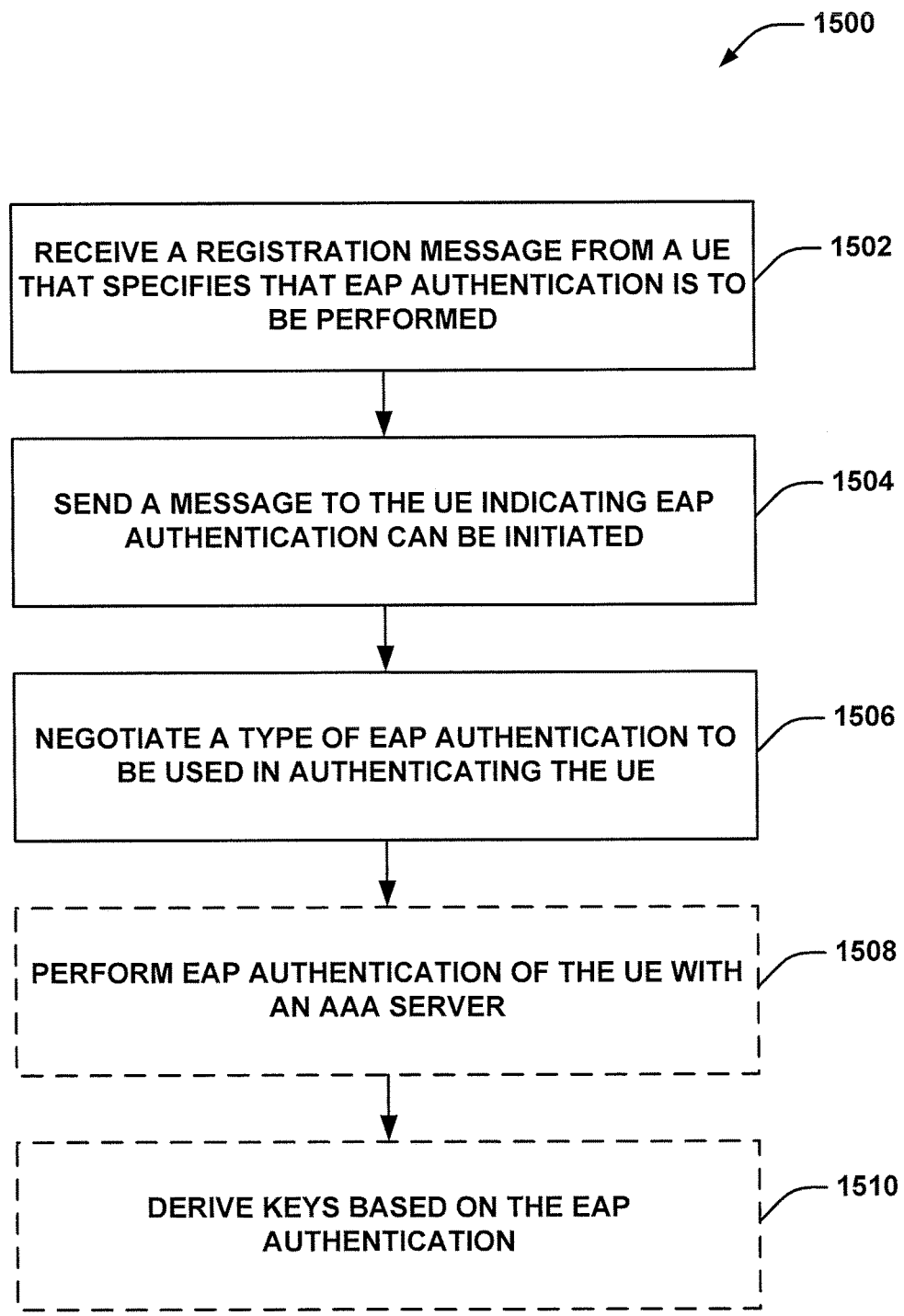
FIG. 15 illustrates an example method for authenticating devices for accessing wireless network services in accordance with aspects described herein.

Turning now to FIGS. 13-15, additional aspects of the present apparatus and method are depicted with reference to one or more components and one or more methods that may perform the actions or functions described herein. Although the operations described below in FIGS. 14 and 15 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 13 depicts a system 1300 for requesting authentication for accessing a wireless network. System 1300 includes a UE 106 that communicates with a network entity 304 to request authentication for accessing network services, as described herein. Network entity 304 can communicate with one or more network components to authenticate the UE 106, such as a AAA server 122.

UE 106 may include a network/service connecting component 306, as described, for determining network identification information and/or service identification information related to network entity 304. For example, network/service connecting component 306 may include a connection establishing component 312 for establishing a connection with the network entity based at least in part on the network identification information, a service querying component 314 for querying the network entity for a serving provider related thereto, as described herein, an authentication requesting component 1310 for determining a type of authentication to use in accessing a network, and/or an optional key deriving component 1312 for performing a keying function from received authentication information to derive specific integrity protection and encryption keys in communicating with the network. It is to be appreciated that the network/service connecting component 306 may include additional components, which may be omitted from this Figure for ease of explanation.

Network entity 304 may include a network/service decoupling component 308 for separately signaling network identification information and/or related service identification information, as described. Network/service decoupling component 308 may include a connection establishing component 318 for facilitating connection establishment with one or more UEs, a service provisioning component 320 for provisioning service information (e.g., an indication of a service provider) to the one or more UEs, an authenticating component 1314 for receiving or otherwise indicating a type of authentication for accessing the network entity, and/or an optional key deriving component 1316 for deriving similar specific integrity protection and encryption keys based on an encryption function performed on received authentication information. It is to be appreciated that the network/service decoupling component 308 may include additional components, which may be omitted from this Figure for ease of explanation.

FIG. 14 depicts an example method 1400 for requesting authentication for accessing network services. FIG. 15 illustrates an example method 1500 for performing authentication with a UE to provide network services. As described above, UE 106 includes a connection establishing component 312 for establishing a connection with network entity 304, which has connection establishing component 318 for performing the connection establishment with UE 106. An initial connection can be established as an unauthenticated connection to allow the UE 106 to obtain information regarding network services and/or related subscription provider information supported by a network to which network entity 304 relates. In this regard, service querying component 314 can query the network entity 304 for the information, and service provisioning component 320 can communicate related information to the UE 106.

Method 1400 of FIG. 14 includes, at Block 1402, determining to perform EAP authentication with a network. For example, authentication requesting component 1310 can determine to perform EAP authentication with the network (e.g., with network entity 304). For example, service querying component 314 (FIG. 13) can determine that service information received from the network entity 304 indicates an authentication type for network services. In another example, service querying component 314 can determine whether credentials stored in the UE 106 for service or subscription provider information received from the network entity 304 relate to EAP authentication and/or a certain type of EAP authentication, etc. In yet another example, authentication requesting component 1310 can determine to perform EAP authentication based on a type of the network or other type identifier (e.g., as received in a broadcast message, such as SIB, as described, and/or based on information received from the network entity 304 in a dedicated message). For example, the network type may relate to hotspot, offload, etc., and service querying component 314 may determine to perform EAP authentication for hotspot network types.

Method 1400 also includes, at Block 1404, transmitting a registration message over a NAS layer to the network indicating that EAP authentication is to be performed. For instance, connection establishing component 312 can generate and transmit the registration message over the NAS layer to the network (e.g., network entity 304) indicating that EAP authentication is to be performed. For example, the registration message may include an attach request, tracking area update request, a new NAS message defined for indicating EAP authentication, etc. In addition, for example, the registration message may include an indication that EAP is to be performed such as a new value for EPS attach type IE, a specific APN, a new IE indicating EAP authentication, a specific IMSI or other UE identifier, etc. Moreover, for example, the registration message can be a generic NAS transport specifying "EAP," an EAP request NAS message, etc.

Method 1500 of FIG. 15 includes, at Block 1502, receiving a registration message from a UE that specifies that EAP authentication is to be performed. Thus, connection establishing component 318 of network entity 304 can receive the registration message from the UE (e.g., UE 106) that specifies that EAP authentication is to be performed. Connection establishing component 318 can determine this message indicates that EAP authentication is to be performed based at least in part on one of the message aspects described above, such as a certain type of NAS message, certain indicators within the message (e.g., a certain EPS attach type value, a certain APN, a new IE for EAP authentication, a certain IMSI, etc.), and/or the like. Method also includes, at Block 1504, sending a message to the UE indicating EAP authentication can be initiated. In this regard, connection establishing component 318 can transmit the message to the UE (e.g., UE 106) indicating EAP authentication can be initiated. Moreover, for example, the response message can be a generic NAS transport specifying "EAP," an EAP response NAS message, etc.

Method 1400 includes, at Block 1406, receiving a response indicating whether EAP authentication can be initiated. Connection establishing component 312 can receive the response indicating whether EAP authentication can be initiated (e.g., from network entity 304). Method 1400 also includes, at Block 1408, indicating a type of EAP authentication by using EAP signaling with the network. For example, authentication requesting component 1310 can determine a type of EAP authentication, and can indicate the type to the network (e.g., by EAP signaling over the connection established by connection establishing component 312). In one example, authentication requesting component 1310 can determine the type of EAP authentication based on a type of the network as received in a broadcast or dedicated message from network entity 304, information regarding a services provided by the network and/or subscription providers supported by the network as received by service querying component 314, and/or the like. For example, the EAP authentication type can include at least one of EAP-transport layer security (EAP-TLS), EAP-tunneled TLS (EAP-TTLS), EAP-authentication and key agreement (EAP-AKA), EAP-AKA prime (EAP-AKA'), EAP-protected EAP (EAP-PEAP), EAP TLS MS challenge-handshake authentication protocol version 2 (EAP TLS MSCHAPv2), EAP-generic token card (EAP-GTC), and/or the like.

Method 1500 includes, at Block 1506, negotiating the type of EAP authentication to be used in authenticating the UE. Authenticating component 1314 can negotiate the type of EAP authentication to be used in authenticating the UE (e.g., UE 106). Thus, for example, authenticating component 1314 can receive the EAP authentication type indicated by UE 106, and can accept the type and/or can respond with another EAP authentication type to UE 106 (e.g., where the type indicated by the UE 106 is not supported). Method 1500 also optionally includes, at Block 1508, performing EAP authentication of the UE with an AAA server. Thus, for example, once the EAP type is agreed upon by the UE 106 and network entity 304, authenticating component 1314 can perform EAP authentication of the UE (e.g., UE 106) with the AAA server (e.g., AAA server 122). For example, this can include communicating related credentials received in EAP messages from the UE 106 to AAA server 122. In one example, network entity 304 establishes an EAP Radius/Diameter exchange with AAA server 122 (e.g., via a gateway or otherwise) for performing authentication for the UE 106. Once the authentication is performed, authenticating component 1314 can communicate an authentication status back to the UE 106, which is received by authentication requesting component 1310 and used to determine whether to communicate with the network.

Method 1400 may include, at Block 1410, deriving keys based on the EAP authentication. Thus, for example, UE 106 may include a key deriving component 1312 for deriving keys based on the EAP authentication. This may include performing a keying function from received authentication information to derive specific integrity protection and encryption keys to utilize in subsequent communications with network entity 304 (e.g., over eNB 108). Method 1500 can similarly include, at Block 1510, deriving keys based on the EAP authentication. Thus, for example, network entity 304 may also include a key deriving component 1316 for deriving keys based on the EAP authentication. This may similarly include specific integrity protection and encryption keys based on an encryption function performed on received authentication information. In one example, key deriving component 1316 provides the keys and/or related information to an eNB 108 or other network component to facilitate ensuring UE 106 is authenticated to access network entity 304 via the eNB 108 or other network component.

Figure 16:
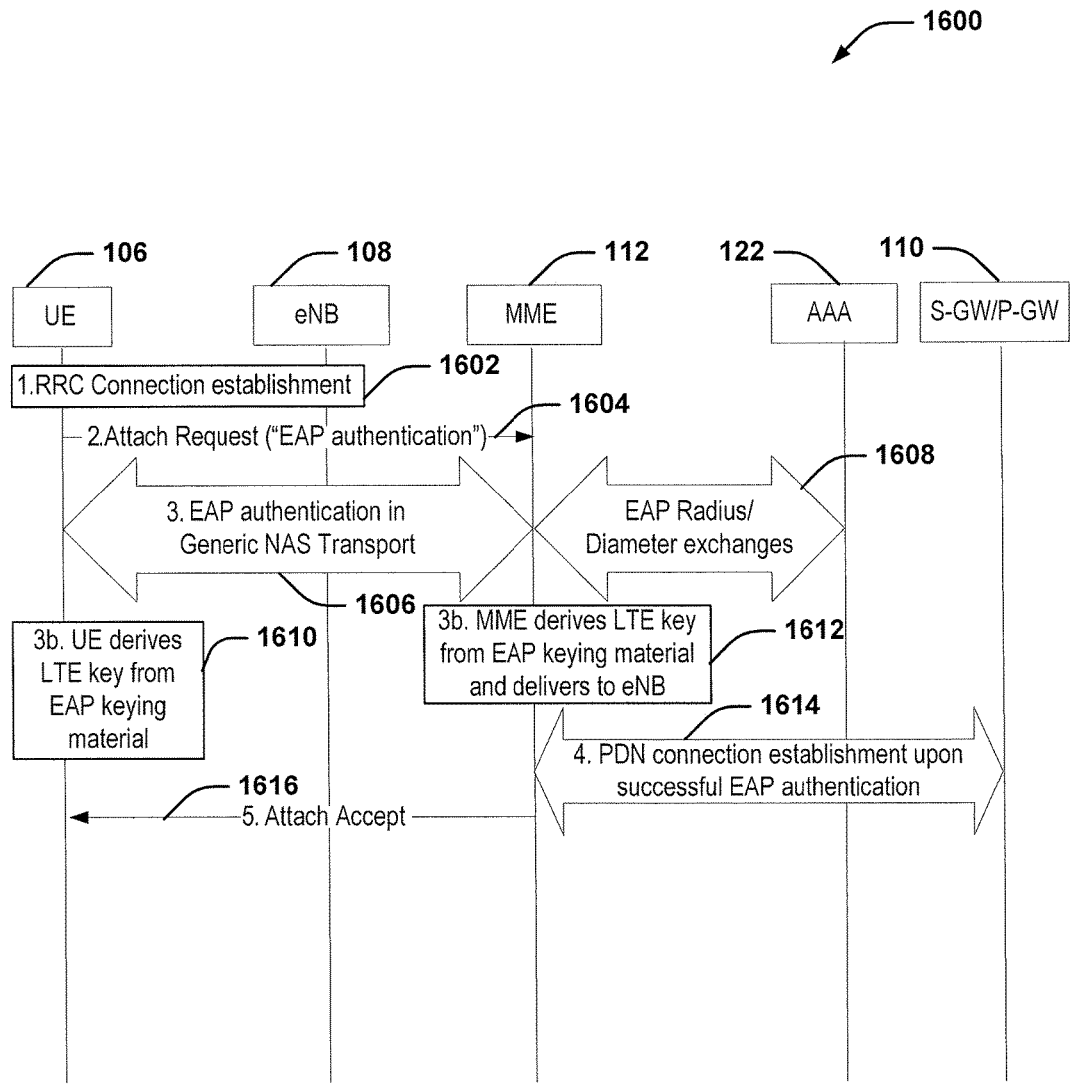
FIGS. 16 and 17 illustrate example systems for authenticating devices for accessing available wireless network services in accordance with aspects described herein.
Figure 17:
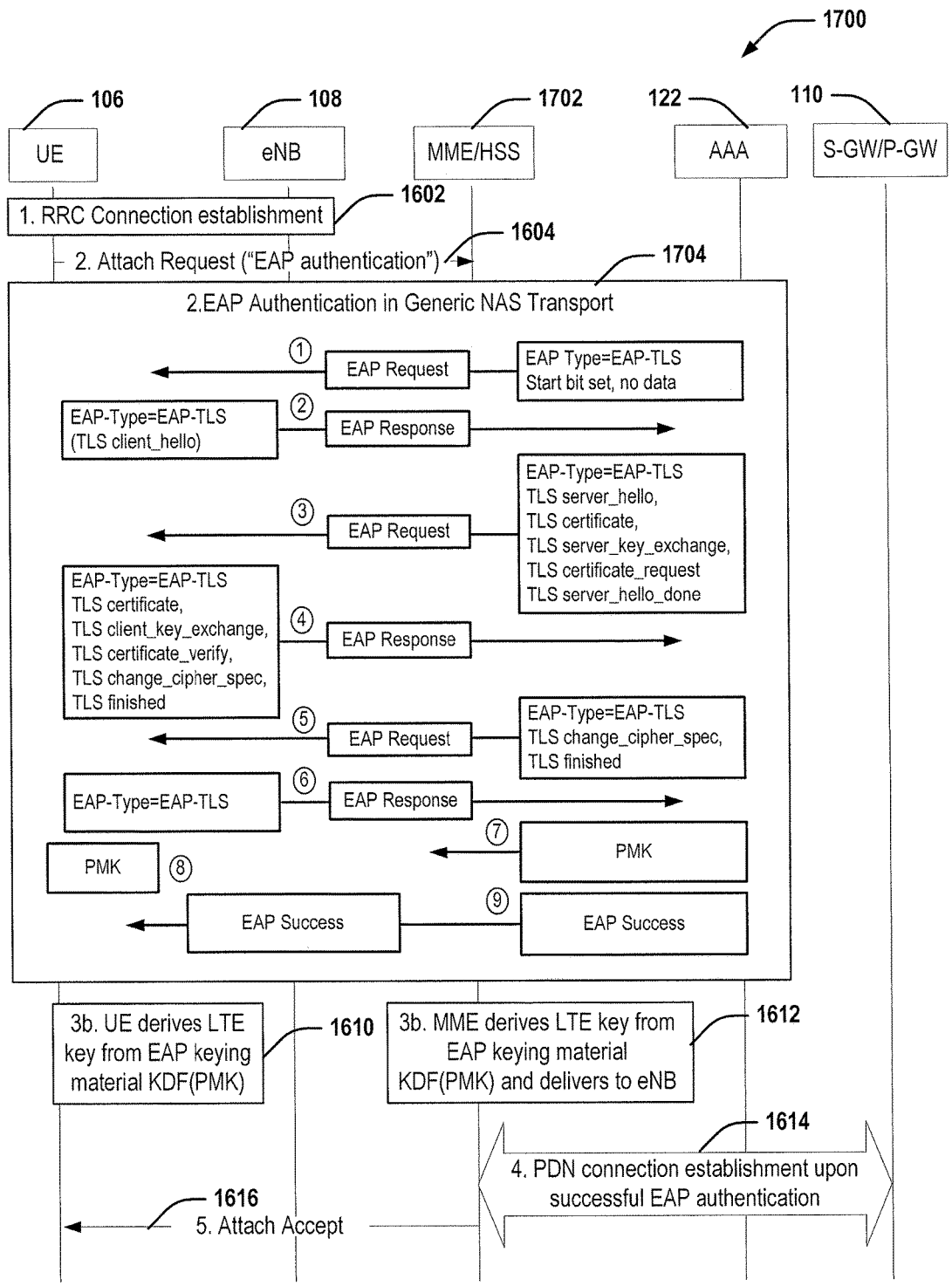

FIGS. 16 and 17 illustrate example systems 1600 and 1700 depicting message flow between a UE 106, eNB 108, MME 112 (or MME/HSS 1702 in FIG. 17), SGW/PGW 110, AAA 122 in accordance with aspects described with respect to FIGS. 13-15 above. In FIG. 16, at 1602, the UE 106 establishes an RRC connection with eNB 108 for setting up an authenticated connection with network. At 1604, UE 106 sends an Attach Request providing an indication that EAP authentication is required to MME 112 (or MME/HSS 1702 in FIG. 17). In order to do so, for example, a new value may be defined for EPS attach type IE: "EPS attach with EAP authentication." Alternatively, in an example, this can be indicated using a specific APN, or a new IE indicating EAP authentication is expected. Moreover, in another example, a new type of Attach message could be used or a specific IMSI or UE identifier type that the UE can provide and is interpreted by the MME 112 (or MME/HSS 1702 in FIG. 17) as indicating the need to use EAP so that no new IEs are needed.

Accordingly, EAP authentication is performed over generic NAS transport at 1606 and 1608, where EAP Radius/Diameter exchanges can occur between MME 112 and AAA 122 at 1608. In FIG. 17, an example EAP authentication using EAP-TLS is shown at 1704. In either case, for example, Generic NAS Transport with EAP type can be used to exchange EAP signaling. Upon successful authentication, the UE 106 and the MME 112 (or MME/HSS 1702 in FIG. 17) derive the LTE keying material from the EAP keying material through a KDF (key Derivation Function), at 1610 and 1612 respectively. Alternatively, in an example, a new NAS EAP request/response pair of messages may be used. Additionally, for example, MME 112 may provision the eNB 108 with the keys for utilizing in communicating with UE 106. Upon successful authentication, MME 112 (or MME/HSS 1702 in FIG. 17) triggers the PDN connection establishment for UE 106 at 1614, and can send an attach accept message to the UE 106 at 1616.

Figure 18:
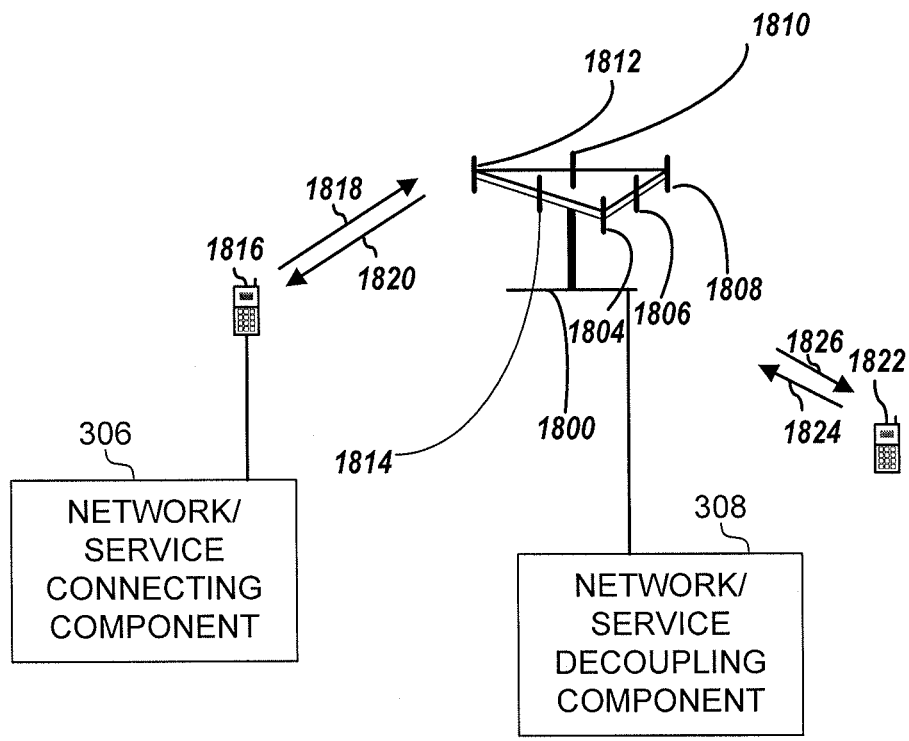
FIG. 18 illustrates a multiple access wireless communication system according to one embodiment.

Referring to FIG. 18, a multiple access wireless communication system according to one embodiment is illustrated. An access point 1800 (AP) includes multiple antenna groups, one including 1804 and 1806, another including 1808 and 1810, and an additional including 1812 and 1814. In FIG. 18, only two antennas are shown for each antenna group, however, more or fewer antennas can be utilized for each antenna group. In addition, AP 1800 can include a network/service decoupling component 308, as described herein, to provide network identification information and service identification information to one or more UEs (e.g., access terminals), where the service identification information may include supported subscription providers, information for obtaining credentials, etc. Access terminal 1816 (AT) is in communication with antennas 1812 and 1814, where antennas 1812 and 1814 transmit information to access terminal 1816 over forward link 1820 and receive information from access terminal 1816 over reverse link 1818. Access terminal 1822 is in communication with antennas 1804 and 1806, where antennas 1804 and 1806 transmit information to access terminal 1822 over forward link 1826 and receive information from access terminal 1822 over reverse link 1824. In a FDD system, communication links 1818, 1820, 1824 and 1826 can use different frequency for communication. For example, forward link 1820 can use a different frequency then that used by reverse link 1818. In addition, ATs 1816 and/or 1822 can include a network/service connecting component 306, as described herein, to request information regarding network services, supported subscription providers, credentials, etc.

Each group of antennas and/or the area in which they are designed to communicate is often referred to as a sector of the access point. In the embodiment, antenna groups each are designed to communicate to access terminals in a sector of the areas covered by access point 1800.

In communication over forward links 1820 and 1826, the transmitting antennas of access point 1800 utilize beamforming in order to improve the signal-to-noise ratio of forward links for the different access terminals 1816 and 1822. Also, an access point using beamforming to transmit to access terminals scattered randomly through its coverage causes less interference to access terminals in neighboring cells than an access point transmitting through a single antenna to all its access terminals.

Moreover, access terminals 1816 and 1822 can provide UE functionality to observe network services advertised by access point 1800, received provisioned credentials, perform authentication based on the credentials, etc., as described herein.

Figure 19:
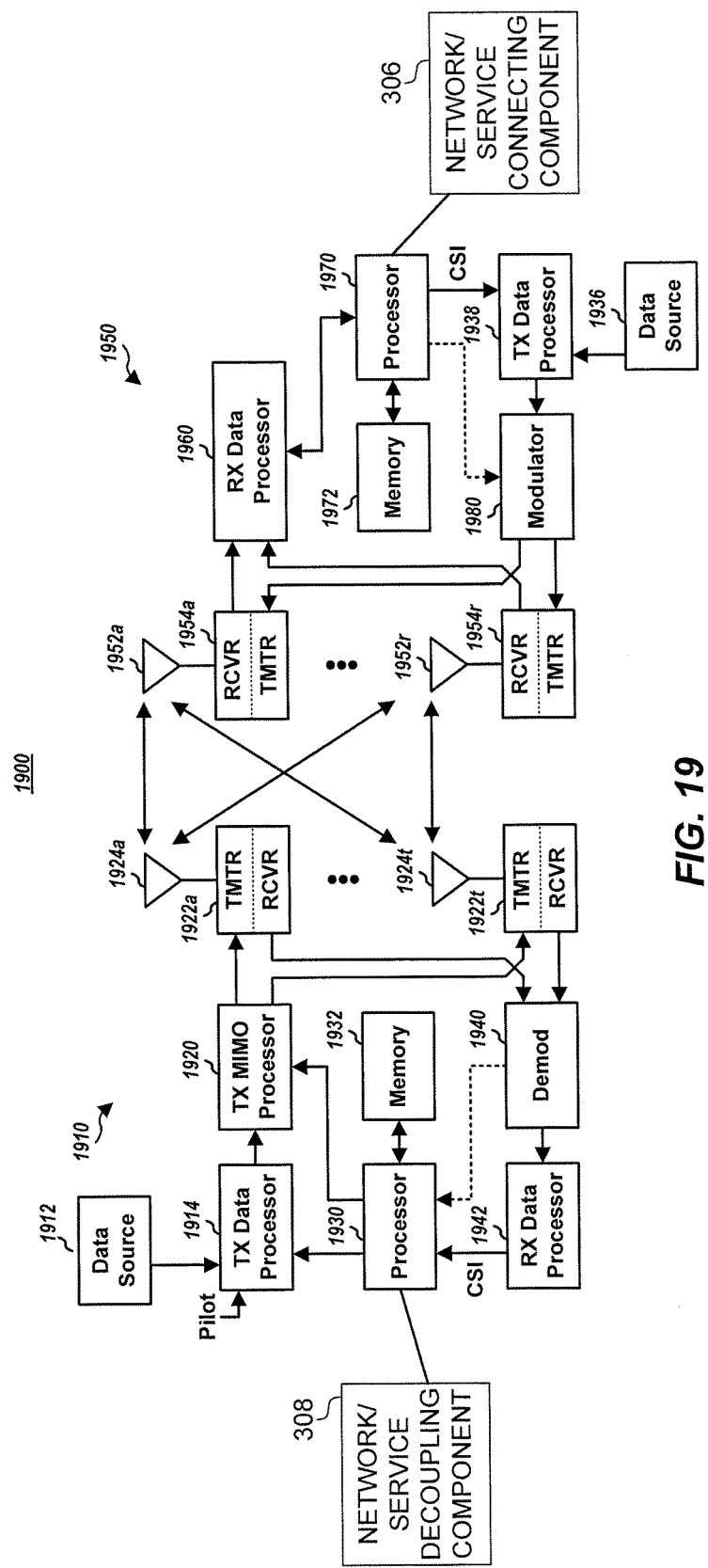
FIG. 19 illustrates a block diagram of a communication system.

FIG. 19 is a block diagram of an embodiment of a transmitter system 1910 (also known as the access point) and a receiver system 1950 (also known as access terminal) in a MIMO system 1900. At the transmitter system 1910, traffic data for a number of data streams is provided from a data source 1912 to a transmit (TX) data processor 1914. In addition, it is to be appreciated that transmitter system 1910 and/or receiver system 1950 can employ the systems (FIGS. 1-3, 6, 8, 12, 13, 16, and 17) and/or methods (FIGS. 4, 5, 7, 9-11, 14, and 15) described herein to facilitate wireless communication there between. For example, components or functions of the systems and/or methods described herein can be part of a memory 1932 and/or 1972 or processors 1930 and/or 1970 described below, and/or can be executed by processors 1930 and/or 1970 to perform the disclosed functions.

In an example, transmitter system 1910 may include an eNB, and may thus include a network/service decoupling component 308, as described herein, to provide network identification information and service identification information to one or more UEs (e.g., access terminals), where the service identification information may include supported subscription providers, information for obtaining credentials, etc. The network/service decoupling component 308 may be communicatively coupled with one or more processors 1930 for executing functions associated with the component 308 and/or components thereof, as described herein (e.g., in FIGS. 3, 8, 13, etc.), such to perform methods 500 (FIG. 5), 1000 (FIG. 10), 1500 (FIG. 15), etc. In another example, receiver system 1950 may include a UE, and may thus include a network/service connecting component 306, as described herein, to request information regarding network services, supported subscription providers, credentials, etc. The network/service connecting component 306 may be communicatively coupled with one or more processors 1970 for executing functions associated with the component 306 and/or components thereof, as described herein (e.g., in FIGS. 3, 8, 13, etc.), such to perform methods 400 (FIG. 4), 700 (FIG. 7), 9000 (FIG. 9), 1400 (FIG. 14), etc.

In an embodiment, each data stream is transmitted over a respective transmit antenna. TX data processor 1914 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 1930.

The modulation symbols for all data streams are then provided to a TX MIMO processor 1920, which can further process the modulation symbols (e.g., for OFDM). TX MIMO processor 1920 then provides $N_T$ modulation symbol streams to $N_T$ transmitters (TMTR) 1922a through 1922t. In certain embodiments, TX MIMO processor 1920 applies beamforming weights to the symbols of the data streams and to the antenna from which the symbol is being transmitted.

Each transmitter 1922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1922a through 1922t are then transmitted from $N_T$ antennas 1924a through 1924t, respectively.

At receiver system 1950, the transmitted modulated signals are received by $N_R$ antennas 1952a through 1952r and the received signal from each antenna 1952 is provided to a respective receiver (RCVR) 1954a through 1954r. Each receiver 1954 conditions (e.g., filters, amplifies, and downconverts) a respective received signal, digitizes the conditioned signal to provide samples, and further processes the samples to provide a corresponding "received" symbol stream.

An RX data processor 1960 then receives and processes the $N_R$ received symbol streams from $N_R$ receivers 1954 based on a particular receiver processing technique to provide $N_T$ "detected" symbol streams. The RX data processor 1960 then demodulates, deinterleaves, and decodes each detected symbol stream to recover the traffic data for the data stream. The processing by RX data processor 1960 is complementary to that performed by TX MIMO processor 1920 and TX data processor 1914 at transmitter system 1910.

A processor 1970 periodically determines which precoding matrix to use. Processor 1970 formulates a reverse link message comprising a matrix index portion and a rank value portion.

The reverse link message can comprise various types of information regarding the communication link and/or the received data stream. The reverse link message is then processed by a TX data processor 1938, which also receives traffic data for a number of data streams from a data source 1936, modulated by a modulator 1980, conditioned by transmitters 1954a through 1954r, and transmitted back to transmitter system 1910.

At transmitter system 1910, the modulated signals from receiver system 1950 are received by antennas 1924, conditioned by receivers 1922, demodulated by a demodulator 1940, and processed by a RX data processor 1942 to extract the reserve link message transmitted by the receiver system 1950. Processor 1930 then determines which pre-coding matrix to use for determining the beamforming weights then processes the extracted message.

Processors 1930 and 1970 can direct (e.g., control, coordinate, manage, etc.) operation at transmitter system 1910 and receiver system 1950, respectively. Respective processors 1930 and 1970 can be associated with memory 1932 and 1972 that store program codes and data. For example, processors 1930 and 1970 can perform functions described herein with respect to UE 106, eNB 108, MME 112, network entity 304, etc., and/or can operate one or more of the corresponding components. Similarly, memory 1932 and 1972 can store instructions for executing the functionality or components, and/or related data.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for obtaining provisioned credentials for wireless network services, comprising:
   receiving, by a user equipment (UE) from a first network, information regarding at least one of a network service or a subscription provider associated with the first network, wherein the information identifies one or more provisioning servers supported by the first network for obtaining credentials;
   determining, by the UE and based at least in part on the information received from the first network, that credentials for accessing at least one of the network service or the subscription provider have not been configured at the UE for accessing the first network, wherein the determining is based at least in part on the UE searching a data store for the credentials;
   selecting, by the UE and based on the determining that credentials have not been configured at the UE for accessing the first network, a provisioning server included in the one or more provisioning servers supported by the first network for obtaining credentials; and
   transmitting, by the UE, a request to offload a cellular network connection from a second network to the first network, wherein the second network is a cellular network and the request indicates the provisioning server, and wherein the first network is configured with a mobile network operator that at least one of provides access to the network service or is associated with the subscription provider.

2. The method of claim 1, wherein transmitting the request is based at least in part on determining that the first network allows for online provisioning of credentials.

3. The method of claim 1, wherein selecting the provisioning server is further based at least in part on determining an indication of the provisioning server stored in a configuration on the UE.

4. The method of claim 1, wherein determining that credentials have not been configured is based at least in part on determining information regarding the one or more provisioning servers for the first network.

5. The method of claim 1, further comprising:
   establishing the connection with the provisioning server based at least in part on the request to establish the connection with the first network; and
   receiving credentials from the provisioning server over one or more data bearers established over the connection with the first network.

6. The method of claim 5, further comprising establishing an authenticated connection with the first network based at least in part on the credentials.

7. The method of claim 1, wherein transmitting the request comprises transmitting a non-access stratum (NAS) message including at least one of an attach request or a NAS message indicating provisioning.

8. The method of claim 7, wherein the NAS message indicates provisioning based at least in part on at least one of an access point name specified in the NAS message, an information element included in the NAS message, a provisioning server index or identifier specified in the NAS message, a provisioning server type specified in the NAS message, or a default provisioning server specified in the NAS message.

9. The method of claim 8, wherein the access point name is based at least in part on a service provider name of one or more service providers associated with the first network.

10. The method of claim 7, wherein the NAS message indicates provisioning based at least in part on specifying a user equipment identifier or identifier type in the NAS message.

11. The method of claim 1, wherein the request to establish the connection includes an International Mobile Station Equipment Identity of a user equipment.

12. An apparatus for obtaining provisioned credentials for wireless network services, comprising:
    a memory; and
    at least one processor coupled to the memory, wherein the at least one processor is configured to:
    receive, from a first network, information regarding at least one of a network service or a subscription provider associated with the first network, wherein the information identifies one or more provisioning servers supported by the first network for obtaining credentials; and
    determine, based at least in part on the information received from the first network, that credentials for accessing at least one of the network service or the subscription provider have not been configured at the apparatus for accessing the first network, wherein the at least one processor is configured to determine that credentials have not been configured based at least in part on the apparatus searching a data store for the credentials;
    select, based on the determining that credentials have not been configured at the apparatus for accessing the first network, a provisioning server included in the one or more provisioning servers supported by the first network for obtaining credentials, wherein the at least one processor is configured to select the provisioning server based at least in part on receiving, from the first network, an indication of the provisioning server to select; and
    transmit a request to offload a cellular network connection from a second network to the first network, wherein the second network is a cellular network and the request indicates the provisioning server, and wherein the first network is configured with a mobile network operator that at least one of provides access to the network service or is associated with the subscription provider.

13. The apparatus of claim 12, wherein the at least one processor is configured to transmit the request based at least in part on determining that the first network allows for online provisioning of credentials.

14. The apparatus of claim 12, wherein the at least one processor is further configured to select the provisioning server based at least in part on determining an indication of the provisioning server stored in a configuration on the apparatus.

15. The apparatus of claim 12, wherein the at least one processor is configured to determine that credentials have not been configured based at least in part on determining information regarding the one or more provisioning servers for the first network.

16. The apparatus of claim 12, wherein the at least one processor is further configured to establish the connection with the provisioning server based at least in part on the request to establish the connection with the first network, and to receive credentials from the provisioning server over one or more data bearers established over the connection with the first network.

17. The apparatus of claim 16, wherein the at least one processor is further configured to establish an authenticated connection with the first network based at least in part on the credentials.

18. The apparatus of claim 12, wherein the at least one processor is configured to transmit the request as a non-access stratum (NAS) message including at least one of an attach request or a NAS message indicating provisioning.

19. The apparatus of claim 18, wherein the NAS message indicates provisioning based at least in part on at least one of an access point name specified in the NAS message, an information element included in the NAS message, a provisioning server index or identifier specified in the NAS message, a provisioning server type specified in the NAS message, or a default provisioning server specified in the NAS message.

20. The apparatus of claim 19, wherein the access point name is based at least in part on a service provider name of one or more service providers associated with the first network.

21. The apparatus of claim 18, wherein the NAS message indicates provisioning based at least in part on specifying a user equipment identifier or identifier type in the NAS message.

22. The apparatus of claim 12, wherein the request to establish the connection includes an International Mobile Station Equipment Identity of a user equipment.

23. An apparatus for obtaining provisioned credentials for wireless network services, comprising:
    means for receiving, from a first network, information regarding at least one of a network service or a subscription provider associated with the first network, wherein the information identifies one or more provisioning servers supported by the first network for obtaining credentials;
    means for determining, based at least in part on the information received from the first network, that credentials for accessing at least one of the network service or the subscription provider have not been configured at the apparatus for accessing the first network, wherein the means for determining determines that credentials have not been configured based at least in part on the apparatus searching a data store for the credentials;
    means for selecting, based on the determining that credentials have not been configured at the apparatus for accessing the first network, a provisioning server included in the one or more provisioning servers supported by the first network for obtaining credentials, wherein the means for selecting selects the provisioning server based at least in part on receiving, from the first network, an indication of the provisioning server to select; and
    means for transmitting a request to offload a cellular network connection from a second network to the first network, wherein the second network is a cellular network and the request indicates the provisioning server, and wherein the first network is configured with a mobile network operator that at least one of provides access to the network service or is associated with the subscription provider.

24. The apparatus of claim 23, wherein the means for transmitting transmits the request based at least in part on determining that the first network allows for online provisioning of credentials.

25. The apparatus of claim 23, wherein the means for selecting selects the provisioning server further based at least in part on determining an indication of the provisioning server stored in a configuration on the apparatus.

26. The apparatus of claim 23, wherein the means for determining determines that credentials have not been configured based at least in part on determining information regarding the one or more provisioning servers for the first network.

27. The apparatus of claim 23, wherein the means for transmitting further establishes the connection with the provisioning server based at least in part on the request to establish the connection with the first network, and wherein the means for selecting further receives credentials from the provisioning server over one or more data bearers established over the connection with the first network.

28. The apparatus of claim 27, wherein the means for transmitting further establishes an authenticated connection with the first network based at least in part on the credentials.

29. The apparatus of claim 23, wherein the means for transmitting transmits the request as a non-access stratum (NAS) message including at least one of an attach request or a NAS message indicating provisioning.

30. The apparatus of claim 29, wherein the NAS message indicates provisioning based at least in part on at least one of an access point name specified in the NAS message, an information element included in the NAS message, a provisioning server index or identifier specified in the NAS message, a provisioning server type specified in the NAS message, or a default provisioning server specified in the NAS message.

31. The apparatus of claim 30, wherein the access point name is based at least in part on a service provider name of one or more service providers associated with the first network.

32. The apparatus of claim 29, wherein the NAS message indicates provisioning based at least in part on specifying a user equipment identifier or identifier type in the NAS message.

33. The apparatus of claim 23, wherein the request to establish the connection includes an International Mobile Station Equipment Identity of a user equipment.

34. A non-transitory computer-readable medium for obtaining provisioned credentials for wireless network services, comprising:
    code for receiving, by a user equipment (UE) from a first network, information regarding at least one of a network service or a subscription provider associated with the first network, wherein the information identifies one or more provisioning servers supported by the first network for obtaining credentials;
    code for determining, by the UE and based at least in part on the information received from the first network, that credentials for accessing at least one of the network service or the subscription provider have not been configured at the UE for accessing the first network, wherein the code for determining determines that credentials have not been configured based at least in part on the UE searching a data store for the credentials;

code for selecting, by the UE and based on the determining that credentials have not been configured at the UE for accessing the first network, a provisioning server included in the one or more provisioning servers supported by the first network for obtaining credentials, wherein the code for selecting selects the provisioning server based at least in part on receiving, from the first network, an indication of the provisioning server to select; and code for transmitting a request to offload a cellular network connection from a second network to the first network, wherein the second network is a cellular network and the request indicates the provisioning server, and wherein the first network is configured with a mobile network operator that at least one of provides access to the network service or is associated with the subscription provider.

35. The non-transitory computer-readable medium of claim 34, wherein the code for transmitting transmits the request based at least in part on determining that the first network allows for online provisioning of credentials.

36. The non-transitory computer-readable medium of claim 34, wherein the code for selecting selects the provisioning server further based at least in part on determining an indication of the provisioning server stored in a configuration on the UE.

37. The non-transitory computer-readable medium of claim 34, wherein the code for determining determines that credentials have not been configured based at least in part on determining information regarding the one or more provisioning servers for the first network.

38. The non-transitory computer-readable medium of claim 34, wherein the code for transmitting further establishes the connection with the provisioning server based at least in part on the request to establish the connection with the first network, and wherein the code for selecting further receives credentials from the provisioning server over one or more data bearers established over the connection with the first network.

39. The non-transitory computer-readable medium of claim 38, wherein the code for transmitting further establishes an authenticated connection with the first network based at least in part of the credentials.

40. The non-transitory computer-readable medium of claim 34, wherein the code for transmitting transmits the request as a non-access stratum (NAS) message including at least one of an attach request or a NAS message indicating provisioning.

41. The non-transitory computer-readable medium of claim 40, wherein the NAS message indicates provisioning based at least in part on at least one of an access point name specified in the NAS message, an information element included in the NAS message, a provisioning server index or identifier specified in the NAS message, a provisioning server type specified in the NAS message, or a default provisioning server specified in the NAS message.

42. The non-transitory computer-readable medium of claim 41, wherein the access point name is based at least in part on a service provider name of one or more service providers associated with the first network.

43. The non-transitory computer-readable medium of claim 40, wherein the NAS message indicates provisioning based at least in part on specifying a user equipment identifier or identifier type in the NAS message.

44. The non-transitory computer-readable medium of claim 34, wherein the request to establish the connection includes an International Mobile Station Equipment Identity of a user equipment.

\* \* \* \* \*